(12) United States Patent
Higa et al.

(10) Patent No.: US 9,699,496 B2
(45) Date of Patent: Jul. 4, 2017

(54) MEDIA SERVICE USER INTERFACE SYSTEMS AND METHODS

(71) Applicant: Verizon Patent and Licensing Inc., Arlington, VA (US)

(72) Inventors: George M. Higa, Plano, TX (US); Donald H. Relyea, Dallas, TX (US); Ruchir Rodrigues, Dallas, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 68 days.

(21) Appl. No.: 13/941,953

(22) Filed: Jul. 15, 2013

(65) Prior Publication Data

US 2015/0020109 A1  Jan. 15, 2015

(51) Int. Cl.
*H04N 5/445* (2011.01)
*H04N 21/431* (2011.01)
*H04N 21/472* (2011.01)
*H04N 21/485* (2011.01)

(52) U.S. Cl.
CPC ....... *H04N 21/4312* (2013.01); *H04N 21/472* (2013.01); *H04N 21/485* (2013.01)

(58) Field of Classification Search
None
See application file for complete search history.

(56) References Cited

U.S. PATENT DOCUMENTS

| | | | |
|---|---|---|---|
| 2004/0263475 A1* | 12/2004 | Wecker et al. | 345/157 |
| 2010/0131983 A1* | 5/2010 | Shannon et al. | 725/46 |
| 2010/0205563 A1* | 8/2010 | Haapsaari | G06F 3/0485 715/825 |
| 2011/0078731 A1* | 3/2011 | Nishimura | 725/39 |
| 2011/0320320 A1* | 12/2011 | Dearlove | G06Q 10/08 705/27.1 |
| 2013/0219303 A1* | 8/2013 | Eriksson et al. | 715/759 |
| 2014/0344721 A1* | 11/2014 | Prakash | 715/753 |

* cited by examiner

*Primary Examiner* — Brian Yenke
*Assistant Examiner* — Samira Monshi

(57) ABSTRACT

An exemplary method includes a media service user interface system 1) providing a media service graphical user interface ("GUI") for display, 2) detecting user input to launch a user interface customization mode, 3) launching the user interface customization mode, 4) receiving user input defining a customization of the GUI, 5) implementing the customization, and 6) exiting the user interface customization mode. In certain examples, the GUI may include a main menu bar that includes a set of menu objects representing a set of feature modules of the media service and a menu bar management object, the customization mode may be launched in response to a user selection of the menu bar management object included in the main menu bar, and the customization may be of the main menu bar. Corresponding methods and systems are also disclosed.

23 Claims, 21 Drawing Sheets

MEDIA SERVICE USER INTERFACE SYSTEMS AND METHODS

BACKGROUND INFORMATION

A media service such as a subscriber television service provides end users of the service with access to media content through one or more features of the media service. An end user typically interacts with the service by way of a media service user interface that allows the end user to access features of the media service and media content that is accessible through the features. For example, a media service may provide a user interface through which an end user is able to access a video-on-demand feature of the media service and video-on-demand content that is accessible through the video-on-demand feature.

A common challenge for a provider of a media service has been to design and implement a user interface that provides an appropriate balance of information, usability, intuitiveness, control, and functionality that promotes a quality user experience with the media service. The challenge is exacerbated for a provider of a media service that has a robust set of features. While media service user interface technologies have made significant advances, there remains room for improvement.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary media service user interface systems and methods are described herein. The exemplary systems and methods described herein may provide one or more user interfaces configured to facilitate a user interfacing with a computing device (e.g., a mobile computing device such as a tablet computer and/or a smartphone) to interact with a media service, such as to discover and access features of the media service and/or media content provided by the media service. In certain examples, an exemplary system may provide a user interface that may include 1) a main menu bar that includes a set of menu objects each configured for user selection to access a different feature of the media service and 2) one or more tools for use by an end user of the media service to customize the main menu bar. Additionally or alternatively, in certain examples, an exemplary system may provide a user interface that may include 1) a dashboard view that includes feature content associated with one or more features of the media service and 2) one or more tools for use by an end user of the media service to customize the dashboard view.

The main menu bar, dashboard view, and tools for customizing the main menu bar and/or dashboard view may provide one or more benefits to an end user of the media service. For example, the customization tools may facilitate convenient, intuitive, and/or seamless customization of the main menu bar and/or dashboard view by the user. Additionally or alternatively, the user-customized main menu bar and/or dashboard view may provide convenient, intuitive, and/or seamless access to features of the media service. Examples of a main menu bar, a dashboard view, and tools for customizing the main menu bar and the dashboard view will now be described in reference to the accompanying drawings.

Figure 1:
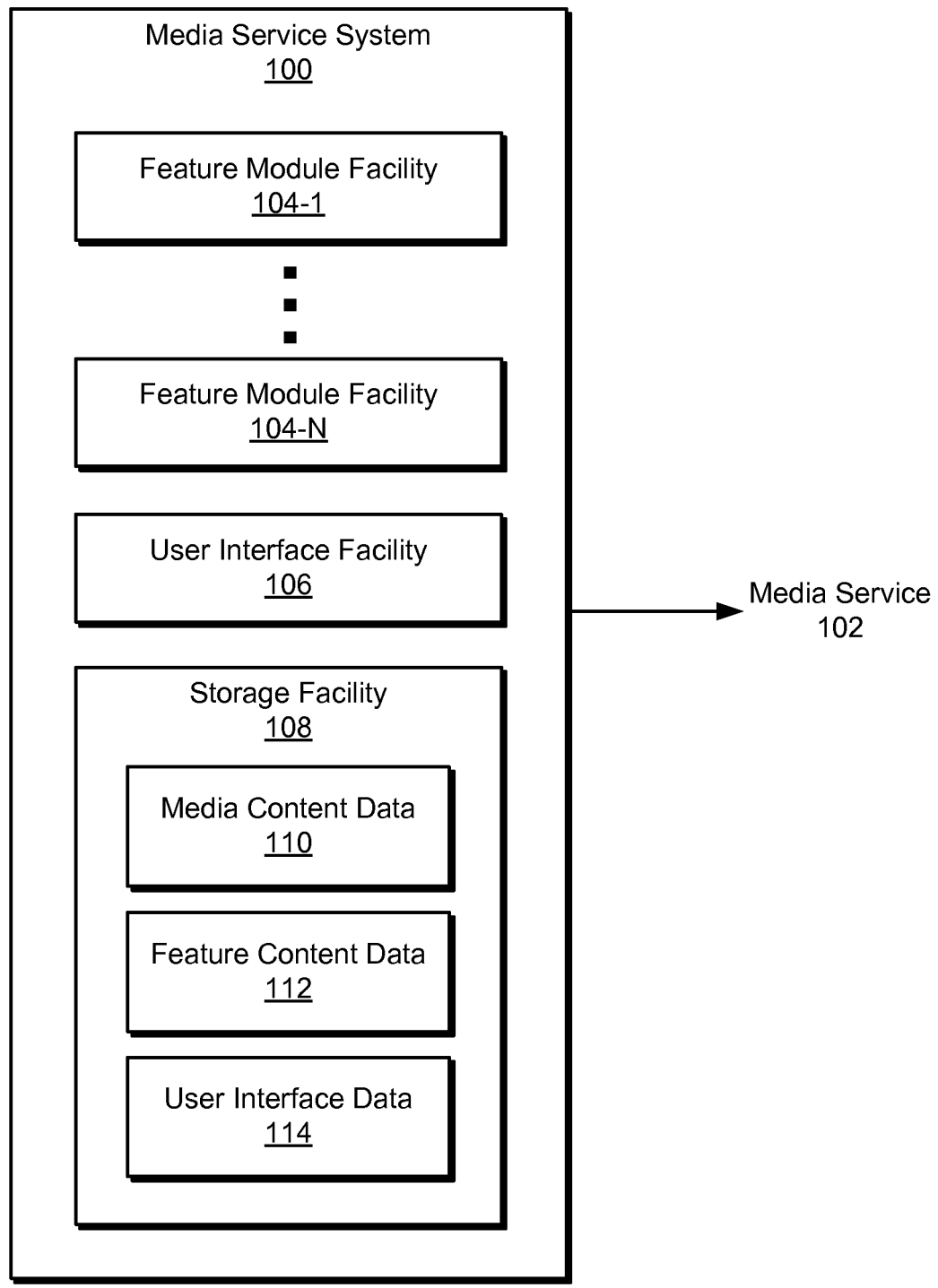
FIG. 1 illustrates an exemplary media service system according to principles described herein.

FIG. 1 illustrates an exemplary media service system 100 ("system 100"). System 100 may be configured to provide a media service 102 to one or more end users of the media service 102 (e.g., to one or more subscribers to the media service 102). The media service 102 may include any service provided by a service provider and through which an end user of the service is able to access media content and/or one or more features of the media service.

As used herein, the term "media content" may refer to any audio, video, and/or audiovisual media content such as a television program, on-demand media program, pay-per-view media program, broadcast media program (e.g., broadcast television program), multicast media program (e.g., multicast television program), narrowcast media program (e.g., narrowcast video-on-demand program), IPTV media program, advertisement, video, movie, audio program, radio program, or any other media program that an end user of the media service 102 may access by way of the media service 102. Such media programs that are made available for user consumption by way of the media service 102 may be accessed and/or played back by an appropriately configured user computing device (e.g., a media player device) for presentation to the user of the device.

As used herein, a "feature" of the media service 102 may include a distinct functionality set of the media service 102. Each functionality set may include a set of one or more functions and/or resources (e.g., computing resources) that provide a particular way to access media content (e.g., by way of a particular media content distribution technology, media content format, etc.), particular information and/or organization of information related to media content, and/or a particular user interface having specific attributes and/or tools (e.g., a user interface configured to facilitate access to media content by way of a particular media content distribution format, media content format, etc.).

Features of the media service 102 may be grouped into separate and/or distinct feature sets referred to herein as "feature modules." Each feature module may include a distinct and/or separate functionality set of the media service 102, at least from a perspective of a user of the media service 102. Examples of feature modules that may be part of the media service 102 include, without limitation, an on-demand media content feature module (e.g., a video-on-demand feature module), a live television programming feature module, an electronic program guide ("EPG") feature module, a digital video recording ("DVR") feature module, a media content popularity feature module (e.g., a "What's Hot" feature module), a feature module dedicated to a particular type of media content (e.g., a sports content feature module, a Spanish programming feature module, a children's programming feature module, etc.), a media content calendar feature module (e.g., a sports calendar feature module), a virtual remote control feature module (e.g., a feature module for virtually controlling a set-top box and/or DVR device), and a feature module provided by a particular software application (e.g., a software application provided by the media service provider or by a third party).

As shown in FIG. 1, system 100 may include, without limitation, a set of feature module facilities 104 (e.g., feature module facilities 104-1 through 104-N), a user interface facility 106, and a storage facility 108, which may be selectively and communicatively coupled to one another by any suitable communication technologies. It will be recognized that although facilities 104-108 are shown to be separate facilities in FIG. 1, any of facilities 104-108 may be combined into fewer facilities, such as into a single facility, or divided into more facilities as may serve a particular implementation.

Storage facility 108 may be configured to store data related to the media service 102, such as media content data 110 representative of media content that may be distributed as part of the media service 102, feature content data 112 representative of feature content generated and/or used by feature module facilities 104, and user interface data 114 generated and/or used by user interface facility 104 to provide one or more user interfaces, such as described herein. Storage facility 108 may maintain additional or alternative data as may serve a particular implementation.

Feature module facilities 104 ("module facilities 104") may be configured to provide feature modules of the media service 102. Each feature module facility 104 may provide a different feature module of the media service 102. A feature module facility 104 may provide any information and/or functionality for a feature module. For example, a feature module facility 104 that provides a DVR feature module may provide DVR functionality, information about DVR operations and/or functionality, DVR media content assets (e.g., recorded media programs), information about media content recorded by a DVR device, computing resources for DVR functionality, and/or a user interface to facilitate user interaction with the DVR feature module.

Feature content data 112 may include any data associated with feature modules of the media service 102, including data representative of "feature content." Feature content may include any content related to a feature module and capable of being presented to an end user of the media service 102 by way of a user interface. For example, a DVR feature module may generate feature content such as information about DVR operations, DVR assets (e.g., DVR recordings of media programs), etc.

Feature module facilities 104 may be configured to provide feature modules that are distinct and independent of one another, at least from the perspective of an end user of the media service 102. For example, a first feature module facility 104 may provide a live television programming feature module, a second feature module facility 104 may provide a video-on-demand feature module, and a third feature module facility 104 may provide a DVR feature module in a manner such that the feature modules are distinct and separate from one another from the perspective of the end user of the media service 102. For example, through a user interface the user may access and/or utilize each feature module separately and independently of the other feature modules.

User interface facility 106 may be configured to provide one or more user interfaces through which end users of the media service 102 may access and interface with the media service 102 to discover and access media content and/or features made accessible through the media service 102. The user interfaces may be in any suitable form. For example, user interface facility 106 may be configured to provide application user interfaces (e.g., user interfaces provided by an application such as a "mobile app" installed and running on a user computing device), media player user interfaces, graphical user interfaces ("GUIs"), and/or any other form of user interfaces configured to facilitate user interaction with the media service 102.

User interface data 114 may include any data and/or user interface content used and/or generated by user interface facility 106. For example, user interface data 114 may include user interface content configured to be presented to an end user of the media service 102 in a user interface provided by user interface facility 106.

User interfaces provided by user interface facility 106 may include GUIs that include tools and/or attributes that are specific to feature modules of the media service 102. For example, a first GUI may be specific to (e.g., dedicated to) a DVR feature module, and a second GUI may be specific to a live television programming feature module. Such GUIs may be referred to as "feature-module-specific" GUIs.

Additionally or alternatively, user interfaces provided by user interface facility 106 may include one or more "menu" GUIs configured to facilitate user navigation of and access to the feature modules and/or feature content provided by feature module facilities 104. To this end, user interface facility 106 may implement a menu user interface system configured to perform one or more of the menu user interface operations described herein.

Figure 2:
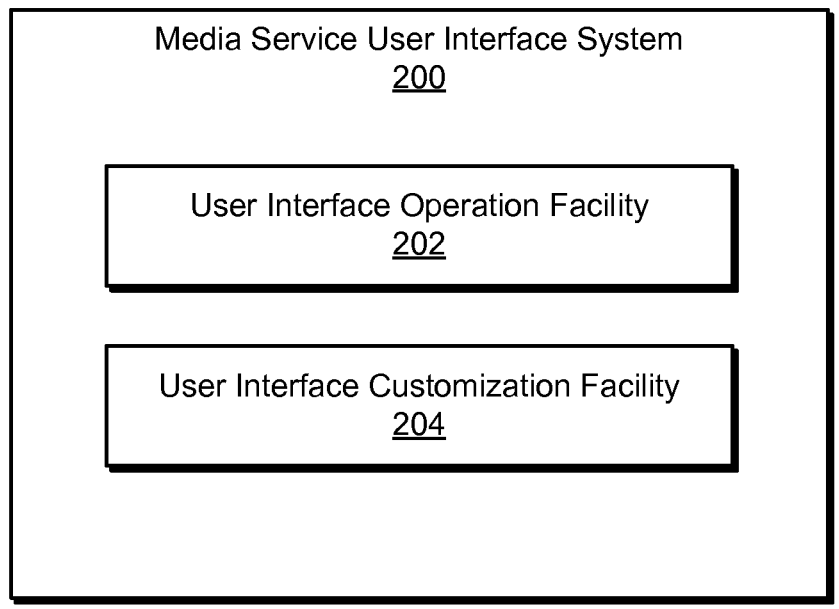
FIG. 2 illustrates an exemplary media service menu user interface system according to principles described herein.

FIG. 2 illustrates an exemplary media service user interface system 200 ("system 200") that may be implemented by user interface facility 106. As shown in FIG. 2, system 200 may include, without limitation, a user interface operation facility 202 and a user interface customization facility 204 ("customization facility 204"), which may be selectively and communicatively coupled to one another by any suitable communication technologies.

User interface operation facility 202 may provide one or more media service user interfaces (e.g., media service menu user interfaces) and/or elements of media service user interfaces configured to facilitate user navigation of and access to the feature modules and/or feature content provided by feature module facilities 104. As an example, user interface operation facility 202 may be configured to provide a dashboard view GUI, examples of which are described herein. As an additional or alternative example, user interface operation facility 202 may be configured to provide a main menu bar for presentation in a media service GUI. Examples of a main menu bar in a media service GUI are also described herein.

User interface operation facility 202 may be configured to operate in an "operation mode" to generate and provide one or more menu user interfaces and/or elements of menu user interfaces to an end user of the media service 102. In certain examples, during operation in the operation mode, user interface operation facility 202 may generate and provide one or more menu user interfaces and/or elements of menu user interfaces to an end user of the media service 102 in accordance with end-user customizations of the one or more menu user interfaces and/or elements of menu user interfaces.

Customization facility 204 may be configured to provide one or more customization tools configured for use by an end user of the media service 102 to customize one or more menu user interfaces and/or elements of menu user interfaces, including the exemplary dashboard menu GUI and/or main menu bar described herein. Examples of such tools and customizations of the dashboard menu GUI and main menu bar are described herein. Customization facility 204 may be configured to operate in one or more "customization modes" configured to facilitate customization of one or more menu user interfaces and/or elements of menu user interfaces.

Examples of end-user-customizable media service GUIs (e.g., media service menu GUIs) and elements of media service GUIs will now be described. Examples of customizations of the media service GUIs and elements of the media service GUIs will also be described.

Figure 3:
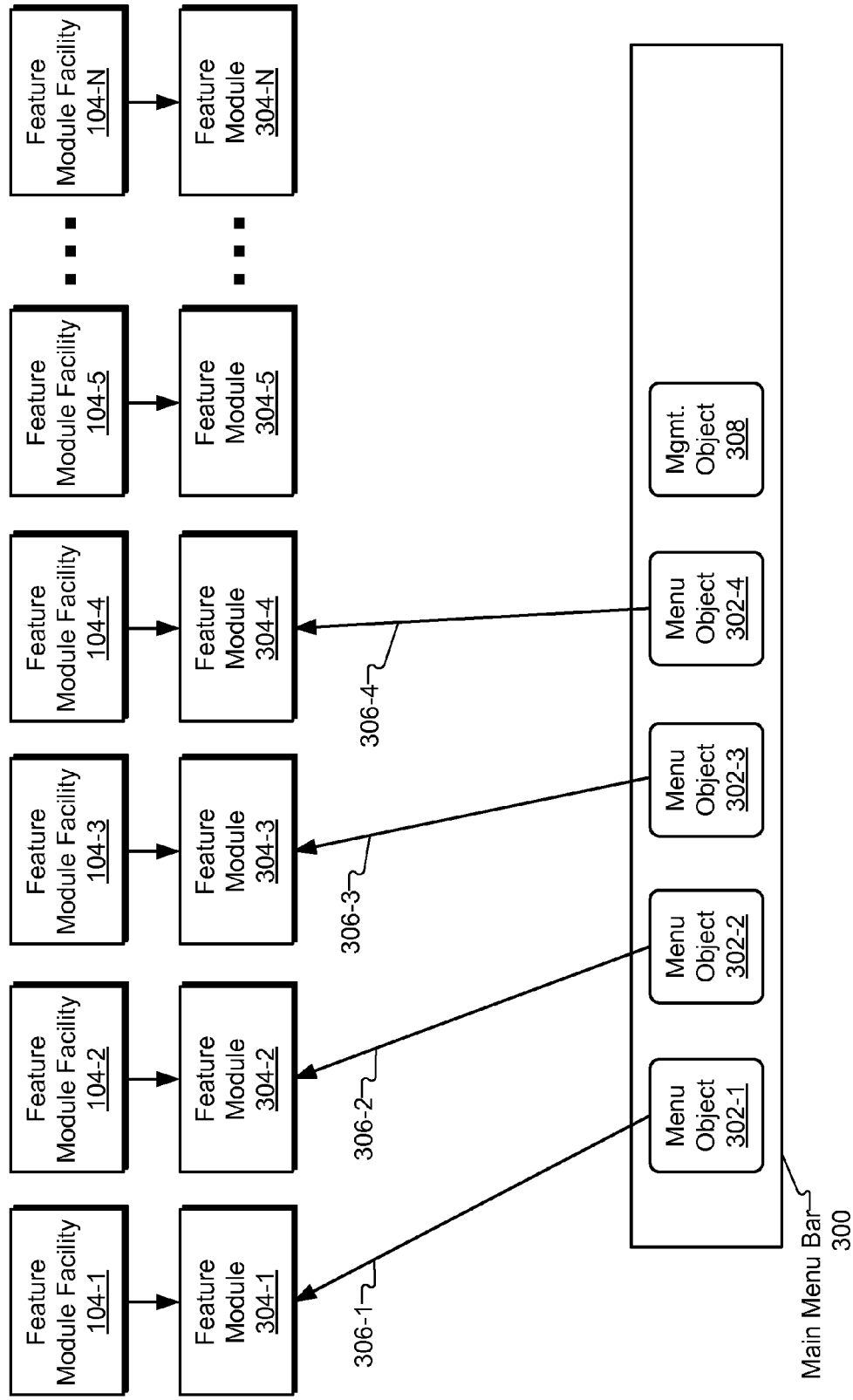
FIG. 3 illustrates an exemplary main menu bar that includes menu objects associated with a set of feature modules of a media service according to principles described herein.

FIG. 3 illustrates an example of a main menu bar 300 that includes a set of menu objects 302 (e.g., menu objects 302-1 through 302-4) each linked to a different feature module included in a set of features modules 304 (e.g., feature modules 304-1 through 304-N) of the media service 102. As shown, feature module facilities 104 (e.g., feature module facilities 104-1 through 104-N) may provide feature modules 304 of the media service 102, and the set of menu objects 302 included in the main menu bar 300 may be linked to any set of the feature modules 304. In the illustrated example, the set of menu objects 302 are linked to a subset of the feature modules 304 that includes the feature module 304-1 provided by feature module facility 104-1, the feature module 304-2 provided by feature module facility 104-2, the feature module 304-3 provided by feature module facility 104-3, and the feature module 304-4 provided by feature module facility 104-4. Arrows 306 (e.g., arrows 306-1 through 306-4) represent the respective links between menu objects 302-1 through 302-4 and feature modules 304-1 through 304-4.

A link may be in any form (e.g., a hyperlink) suitable to map a particular menu object 302 to a particular feature module 304 such that a user selection of the menu object 302 will initiate the performance of one or more operations related to the feature module 304. For example, the particular menu object 302 may be configured for user selection to launch the particular feature module 304 (e.g., by launching a user interface dedicated to the particular feature module 304) to which the menu object 302 is linked. To this end, the link between the menu object 302 and the feature module 304 may indicate that the feature module 304 is to be launched in response to a user selection of the menu object 302 linked to the feature module 304.

A menu object 302 may include any visual representation of a feature module 304 of the media service 102. For example, a menu object 302 may include a graphical icon, text, thumbnail image, or any other suitable visual representation of the corresponding feature module 304.

Customization facility 204 may be configured to provide one or more customization tools configured for use by an end user of the media service 102 to customize main menu bar 300. The tools may be launched for use by the user in any suitable way. For example, main menu bar 300 may include a menu bar management object 308 (e.g., "management object 308"), which may be disposed in-line with the set of menu objects 302 in main menu bar 300 as shown in FIG. 3. Management object 308 may be configured for user selection to launch a menu bar customization mode to facilitate a customization of main menu bar 300 by the user. Accordingly, when the user provides input to select management object 308, customization facility 204 may detect the user selection of management object 308 and launch a menu bar customization mode. During operation in the menu bar customization mode, customization facility 204 may provide one or more tools configured to facilitate user customization of main menu bar 300, receive customization input from the user, and customize main menu bar 300 based on the input.

The placement of management object 308 within main menu bar 300 may provide one or more benefits. For example, the placement of management object 308 within main menu bar 300 may allow a user to conveniently launch the menu bar customization mode without having to navigate away from main menu bar 300 (e.g., without having to navigate to a general settings menu view).

While FIG. 3 illustrates an example in which management object 308 is included in main menu bar 300 and is configured for user selection to launch a menu bar customization mode, the example is illustrative. Other implementations may provide alternative or additional ways by which the menu bar customization mode may be launched by a user.

Figure 4:
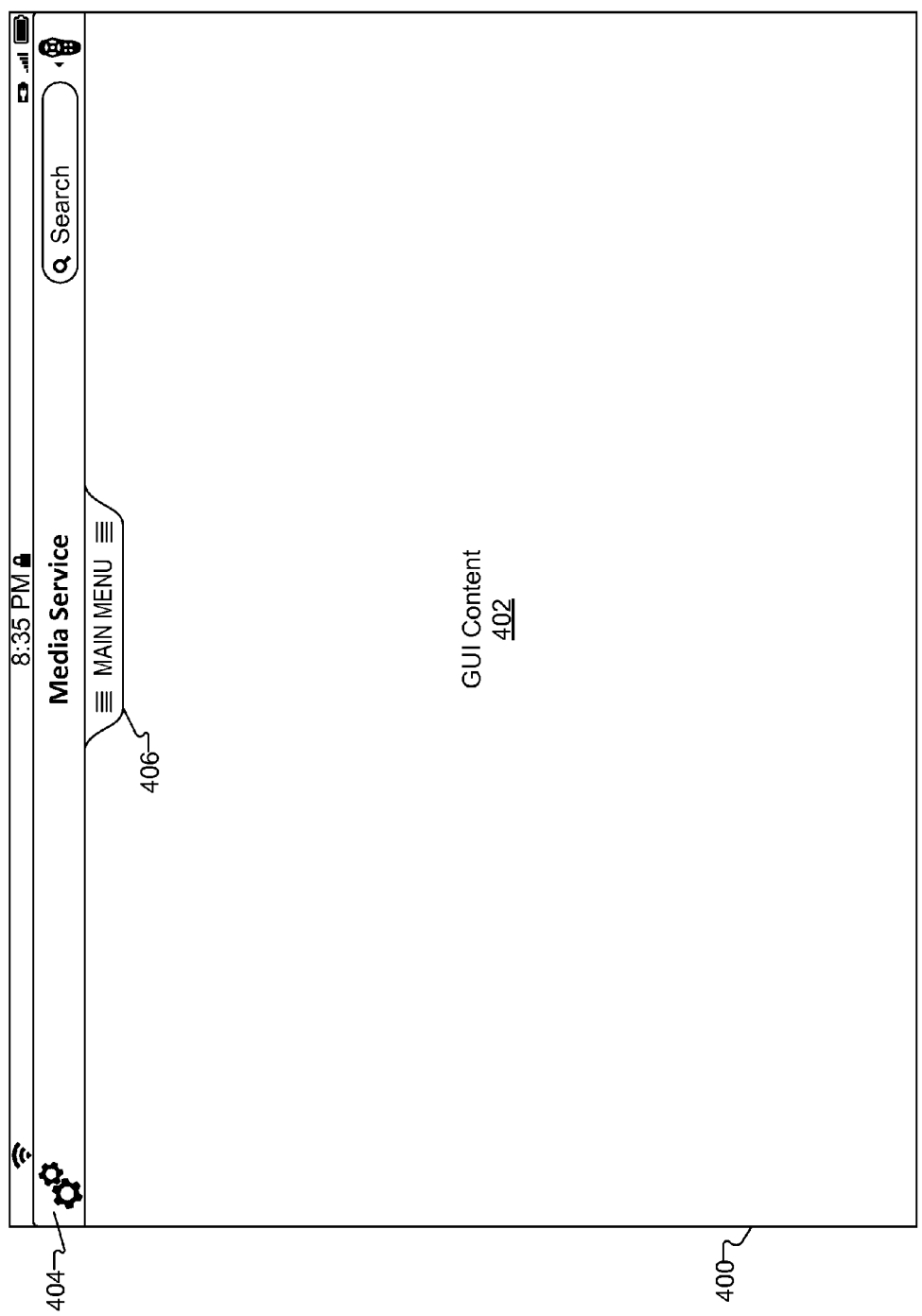
FIGS. 4-11 illustrate exemplary views of a media service graphical user interface according to principles described herein.

FIG. 4 illustrates an exemplary view of a GUI 400 associated with the media service 102. GUI content 402 may be presented in GUI 400 and may include any content visually displayed within GUI 400 and associated with the media service 102. In certain examples, GUI 400 may include a menu GUI for the media service 102, and GUI content 402 may include menu GUI content. In alternative examples, GUI 400 may include a feature-module-specific GUI. In certain examples, GUI content 402 may include feature content provided by one or more feature modules 304 and arranged in a dashboard view within GUI 400. Exemplary dashboards views are described herein.

As shown in FIG. 4, GUI 400 may include a horizontal header bar 404 positioned across and/or near the top of GUI 400. Immediately below the header bar 404, a main menu tab 406 may be displayed. When positioned in a closed position as shown in FIG. 4, main menu tab 406 may be configured for user selection (e.g., by a pull-down touch gesture) to open a display of a main menu bar, such as main menu bar 300, in GUI 400.

In response to a user selection of main menu tab 406, a main menu bar may be displayed in GUI 400 in any suitable way. For example, main menu tab 406 may animatedly slide downward and appear to pull a main menu bar downward into an on-screen position.

Figure 5:
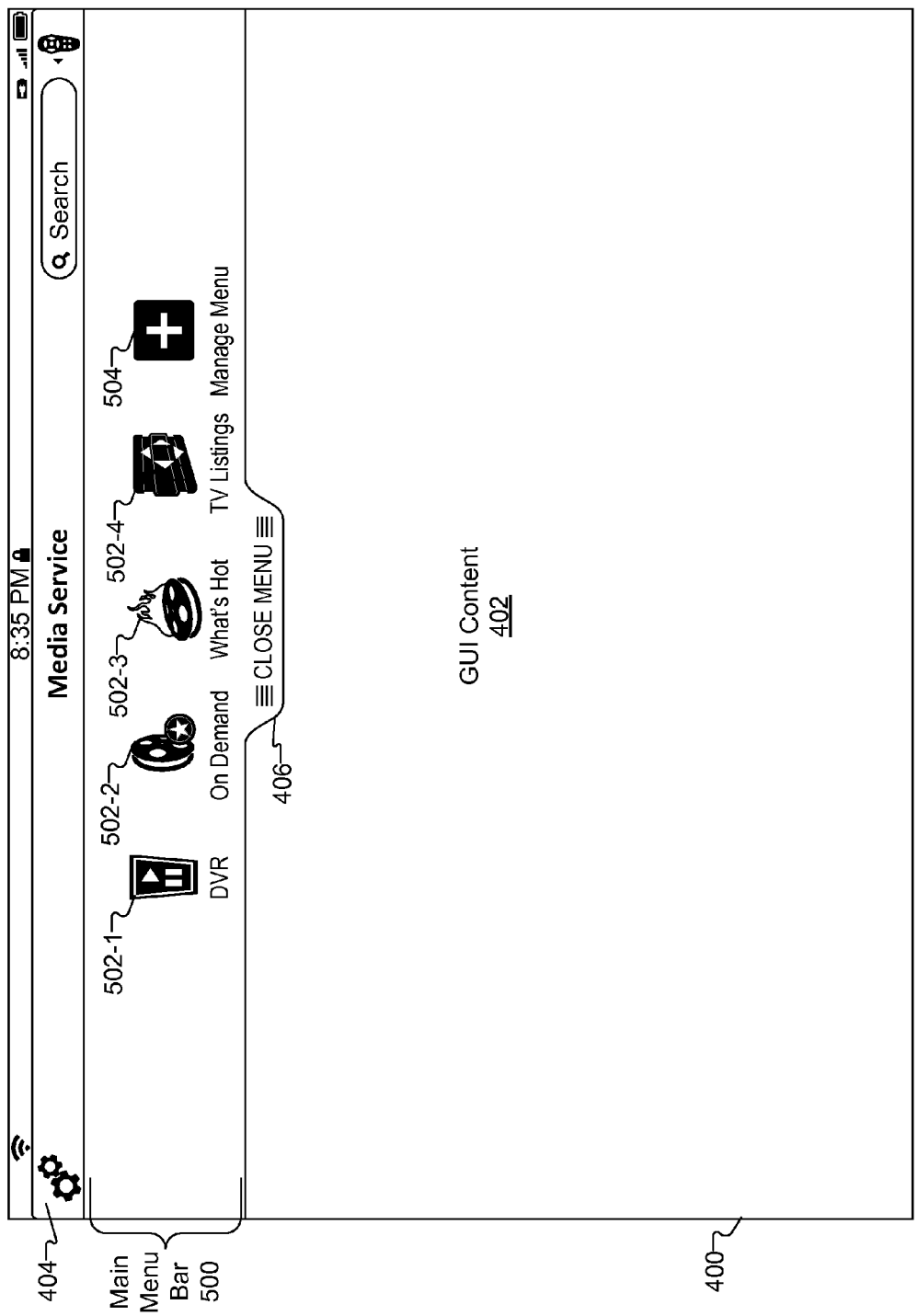

FIG. 5 illustrates an exemplary view of GUI 400 with a main menu bar 500 displayed therein. As shown, main menu bar 500 may include menu objects 502 (e.g., menu objects 502-1 through 502-4) representing feature modules of the media service 102. In the illustrated example, the feature modules represented in main menu bar 500 include "DVR," "On Demand," "What's Hot," and "TV listings" feature modules of the media service 102. A user selection of a particular menu object 502 may trigger performance of one or more operations associated with the feature module represented by the selected menu object 502. Such operations may include a presentation of a GUI associated with the feature module, presentation of feature content associated with the feature module in GUI 400, and/or accessing of functionality of the feature module.

Any suitable user input may be used to select a menu object 502. For example, if the illustrated view of GUI 400 is displayed on a touch screen display, touch input may be used to select a menu object 502. Other suitable input may be used in other implementations.

In certain examples, main menu bar 500 may include a set of menu objects 502 that do not all fit within GUI 400, and main menu bar 500 may be horizontally slidable to scroll menu objects 502 on and/or off of a display screen. This may enhance the customizability of main menu bar 500 by allowing the main menu bar 500 to be customized to include any number of menu objects 502.

As shown, main menu bar 500 may further include a menu bar management object 504 ("management object 504") disposed in-line with menu objects 502. In the illustrated example, management object 504 is positioned at a right-most position in main menu bar 500. In some examples, the placement of management object 504 may be static and/or unchangeable by an end user to provide consistency. In other examples, the placement of management object 504 may be customizable by an end user.

Management object 504 may be configured for user selection to launch a menu bar customization mode configured to facilitate a customization of main menu bar 500 by an end user of the media service 102. Accordingly, a user may provide input to select management object 504, and customization facility 204 may detect and launch a menu bar customization mode in response to the selection of management object 504.

Menu bar customization mode may include customization facility 204 operating in any way suitable to facilitate customization of main menu bar 500 by an end user of the media service 102. For example, customization facility 204 may provide one or more customization tools in GUI 400 for use by the end user to customize main menu bar 500 during operation in the menu bar customization mode. Examples of such customization tools will now be described.

In certain examples, the launching of the menu bar customization mode may include customization facility 204 identifying any feature modules of the media service 102 that are not currently represented in main menu bar 500 (e.g., not included in the set of feature modules represented by the set of menu objects 502 in main menu bar 500). The identification may be performed in any suitable way, such as by comparing feature modules represented by menu objects 502 included in main menu bar 500 to an overall set of feature modules of the media service 102.

Figure 6:
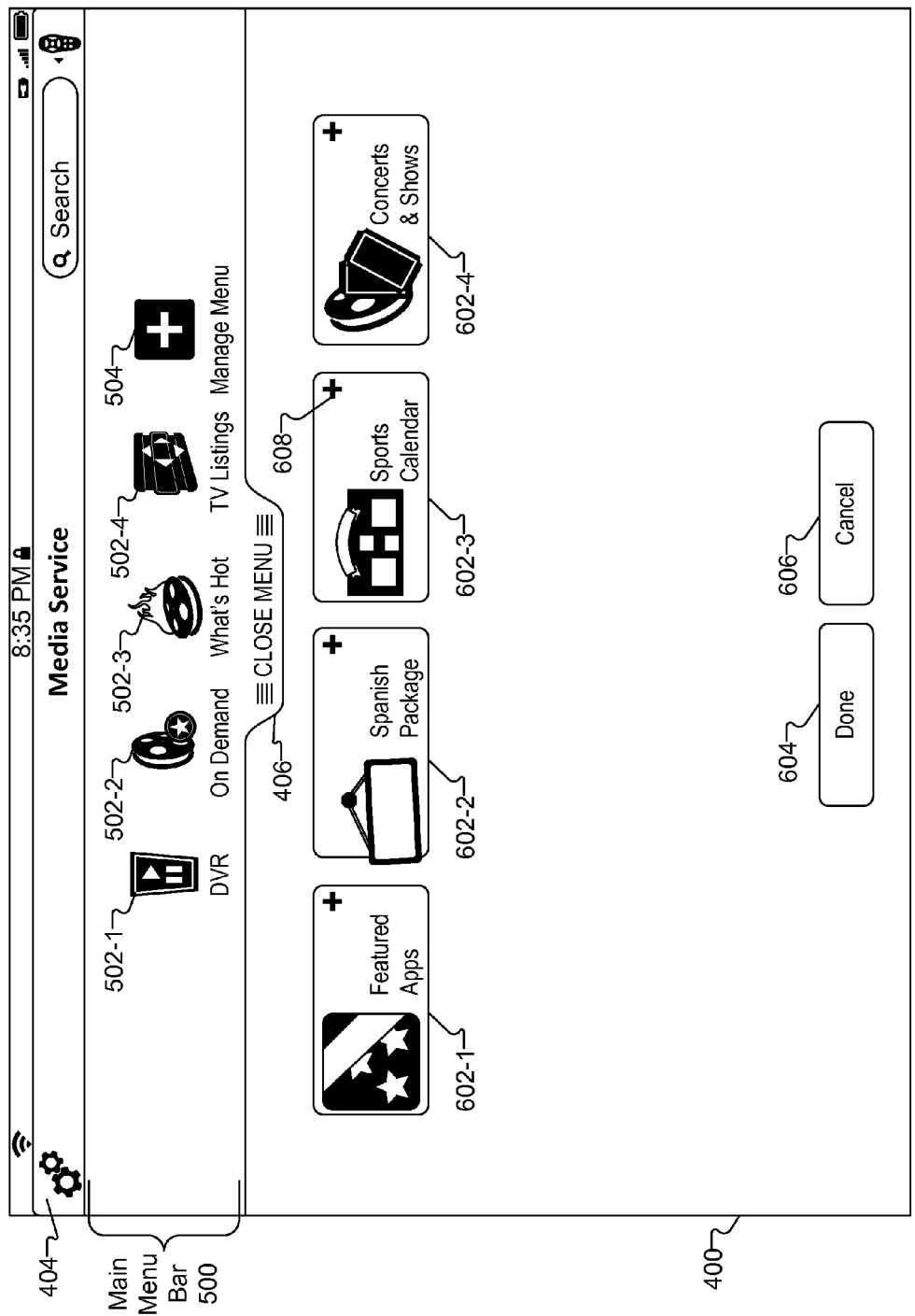

The launching of the menu bar customization mode may further include initiating a presentation of a customization menu object representing each feature module identified as not being included in main menu bar 500. Each customization menu object may be presented during operation in the menu bar customization mode. For example, FIG. 6 illustrates an exemplary view of GUI 400 in which a set of customization menu objects 602 (e.g., customization menu objects 602-1 through 602-4) are displayed together with main menu bar 500 in GUI 400 during operation in the menu bar customization mode. In certain examples, the set of customization menu objects 602 may replace or overlay GUI content 402.

The launching of the menu bar customization mode may also include initiating a display of user-selectable options to exit the menu bar customization mode. For example, as shown in FIG. 6, GUI 400 may include a "Done" option 604 configured to be selected by a user to save customizations made during operation in the menu bar customization mode and exit the menu bar customization mode. GUI 400 may also include a "Cancel" option 606 configured to be selected by a user to exit the menu bar customization mode without saving any customizations made during operation in the menu bar customization mode.

Each customization menu object 602 displayed in GUI 400 may represent a different feature module included in the media service 102 but not currently represented in the main menu bar 500. In the illustrated example, customization menu objects 602-1 through 602-4 respectively represent feature modules labeled "Featured Apps," "Spanish Package," "Sports Calendar," and "Concerts and Shows."

Each customization menu object 602 may be configured to function as a customization tool for use by a user to customize main menu bar 500. To this end, each customization menu object 602 may be configured for user selection to access information about the represented feature module, to access one or more options for customizing main menu bar 500 with the represented feature module, and/or to add the represented feature module to main menu bar 500. As an example, customization menu object 602-1 may be configured for user selection to access information about the "Featured Apps" feature module, to access one or more options for customizing main menu bar 500 with the "Featured Apps" feature module, and/or to add the "Featured Apps" feature module to main menu bar 500.

Figure 7:
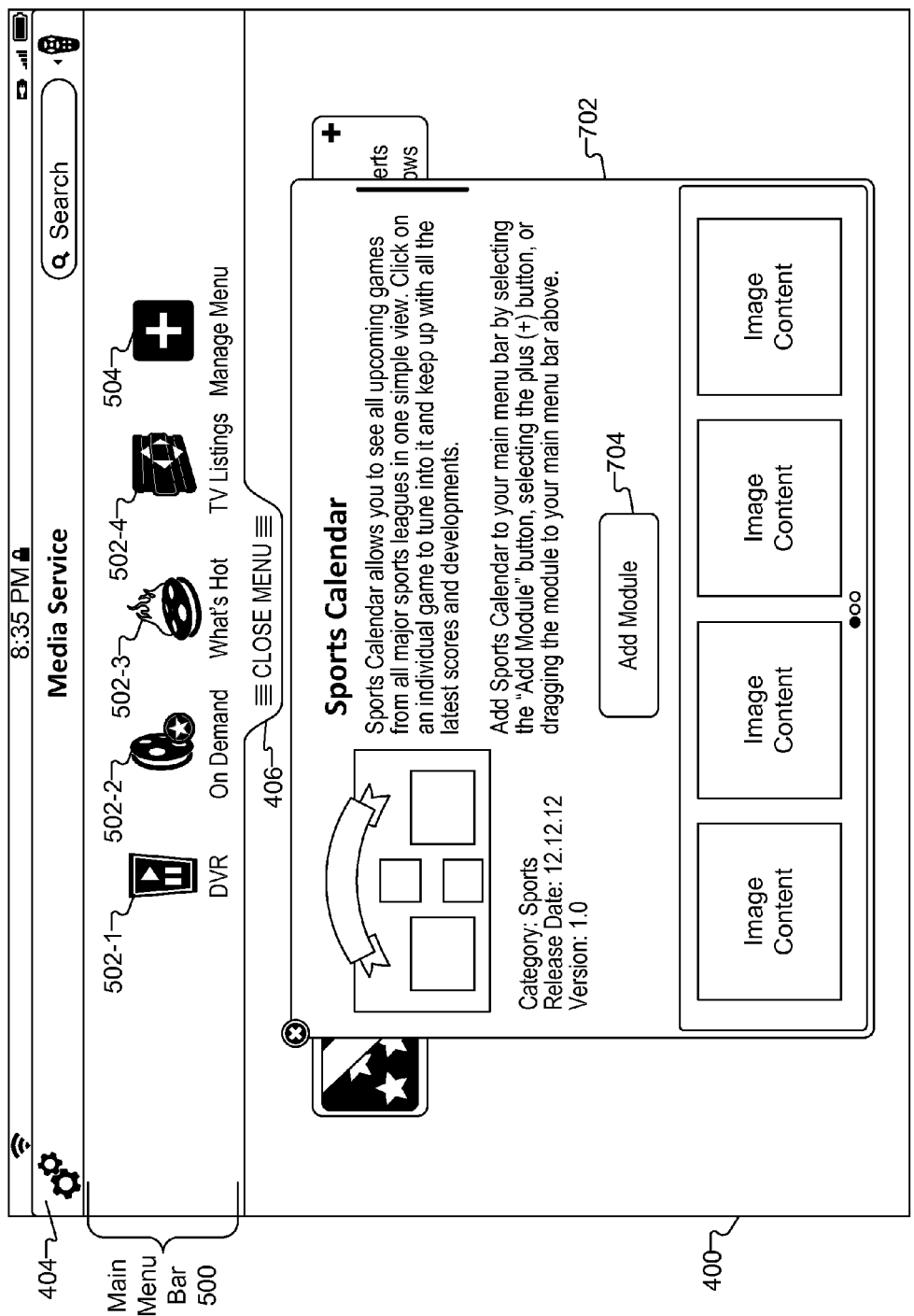

To illustrate, in certain examples, in response to a user selection of customization menu object 602-3, customization facility 204 may present information and/or one or more options associated with the feature model represented by customization menu object 602-3. FIG. 7 illustrates an exemplary view of GUI 400 with information and one or more options associated with the "Sports Calendar" feature module displayed therein. As shown, the information and/or options may be displayed in a pop-up window 702 in GUI 400. The information about feature module may include textual, image, and/or any other information related to the feature module and/or providing instructing to the user as to how to add the feature module to main menu bar 500. In the illustrated example, a user selectable option 704 is displayed together with the information and is configured to be selected by a user to add the "Sports Calendar" feature module to main menu bar 500. In response to a user selection of option 704, customization facility 204 may add a menu object representing the feature module to main menu bar 500.

The feature module may be added to main menu bar 500 in response to other types of user input. Returning in FIG. 6, each customization menu object 602 may include a symbol configured to be selected by a user to add the feature model represented by the customization menu object 602 to main menu bar 500. For example, customization menu object 602-3 includes a "plus" symbol 608 configured for user selection to add the "Sports Calendar" feature module to main menu bar 500. In response to a user selection of symbol 608, customization facilities 204 may add a menu object representing the "Sports Calendar" feature module to main menu bar 500.

Additionally or alternatively, each customization menu object 602 may be configured to be dragged and dropped into main menu bar 500. For example, a user may provide input to drag and drop customization menu object 602-3 into main menu bar 500. In response to this input, customization facility 204 may add customization menu object 602-3 as a menu object representing the "Sports Calendar" feature module in main menu bar 500.

Figure 8:
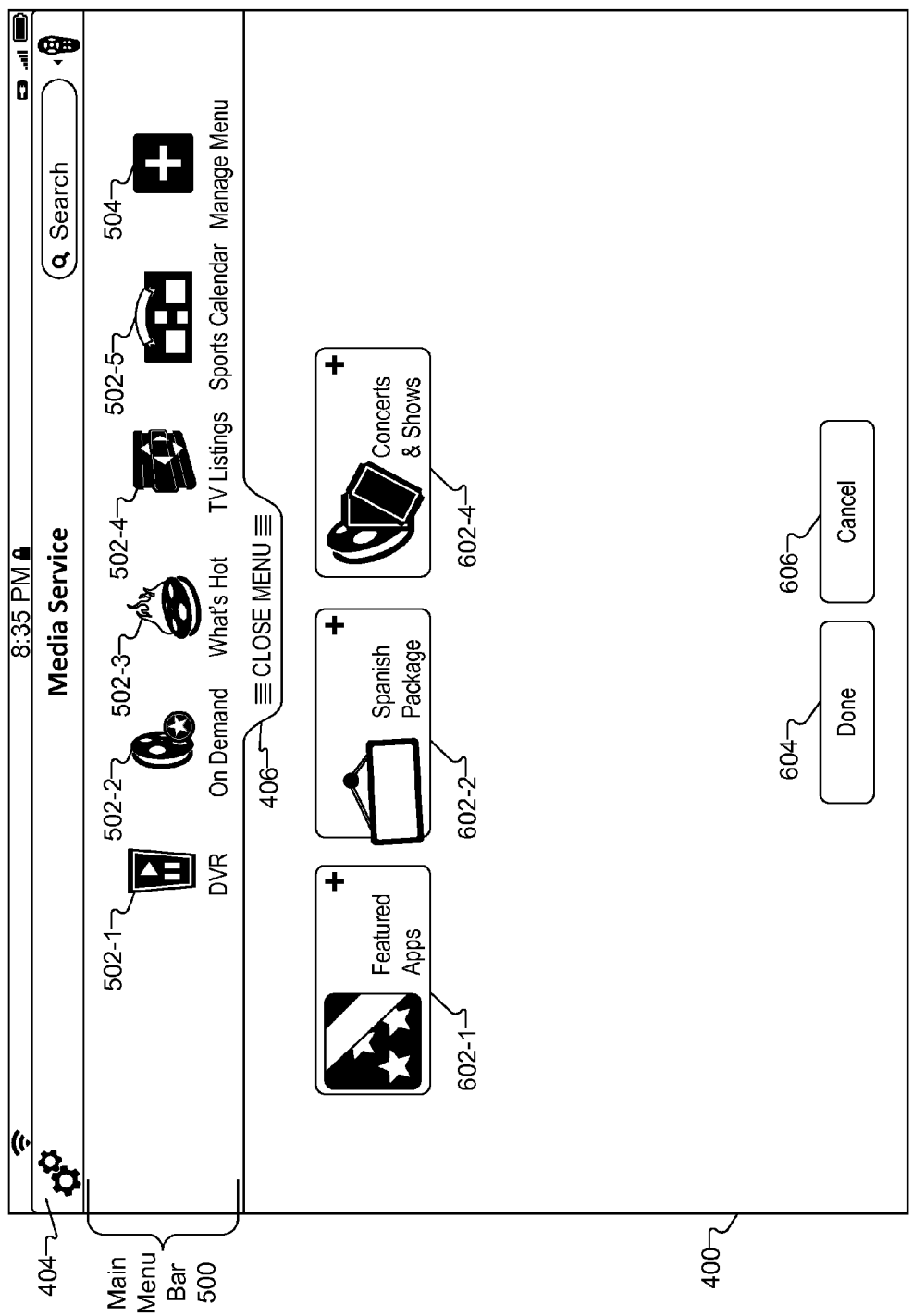

FIG. 8 illustrates an exemplary view of GUI 400 with a new menu object 502-5 included in main menu bar 500 and representing the "Sports Calendar" feature module of the media service 102. In response to the addition of this feature module to main menu bar 500, customization menu object 602-3 representing the feature module has been removed from the set of customization menu objects 602 displayed in GUI 400.

In certain examples, customization facility 204 may be configured to add a menu object representing a feature module at a default position within main menu bar 500. For example, the default position may be predefined to be the right-most menu object in a set of menu objects 502 and/or may be immediately to the left side of management object 504. Menu object 502-5 has been added at this position in FIG. 8.

In certain examples, customization facilities 204 may provide one or more customization tools configured to allow the user to customize the order in which menu objects 502 are arranged in main menu bar 500. As an example, when a user adds a customization menu object 602 to main menu bar 500 by dragging and dropping the customization menu object 602 into the main menu bar 500, the user may drag and drop the customization menu object 602 at a particular position in main menu bar 500.

As another example, customization facility 204 may allow the user to drag and drop menu objects within main menu bar 500. To illustrate, after a new menu object 502-5 has been added to main menu bar 500 as shown in FIG. 8, the user may provide input to drag menu object 502-5 from the position of menu object 502-5 shown in FIG. 8 to a new position in main menu bar 500.

In certain examples, a customization tool for repositioning menu objects 502 within main menu bar 500 may be active whenever customization facility 204 operates in the main menu customization mode. In other examples, a customization tool for repositioning menu objects 502 within main menu bar 500 may be selectively active for use by a user during operation in the main menu customization mode. For example, to activate this customization tool in certain implementations, the user may provide input such as by providing a prolonged touch input anywhere within main menu bar 500. When the duration of the prolonged touch satisfies a predefined duration threshold, customization facility 204 may detect the input and respond by activating the customization tool configured to facilitate rearrangement of one or more menu objects 502 within main menu bar 500.

Figure 9:
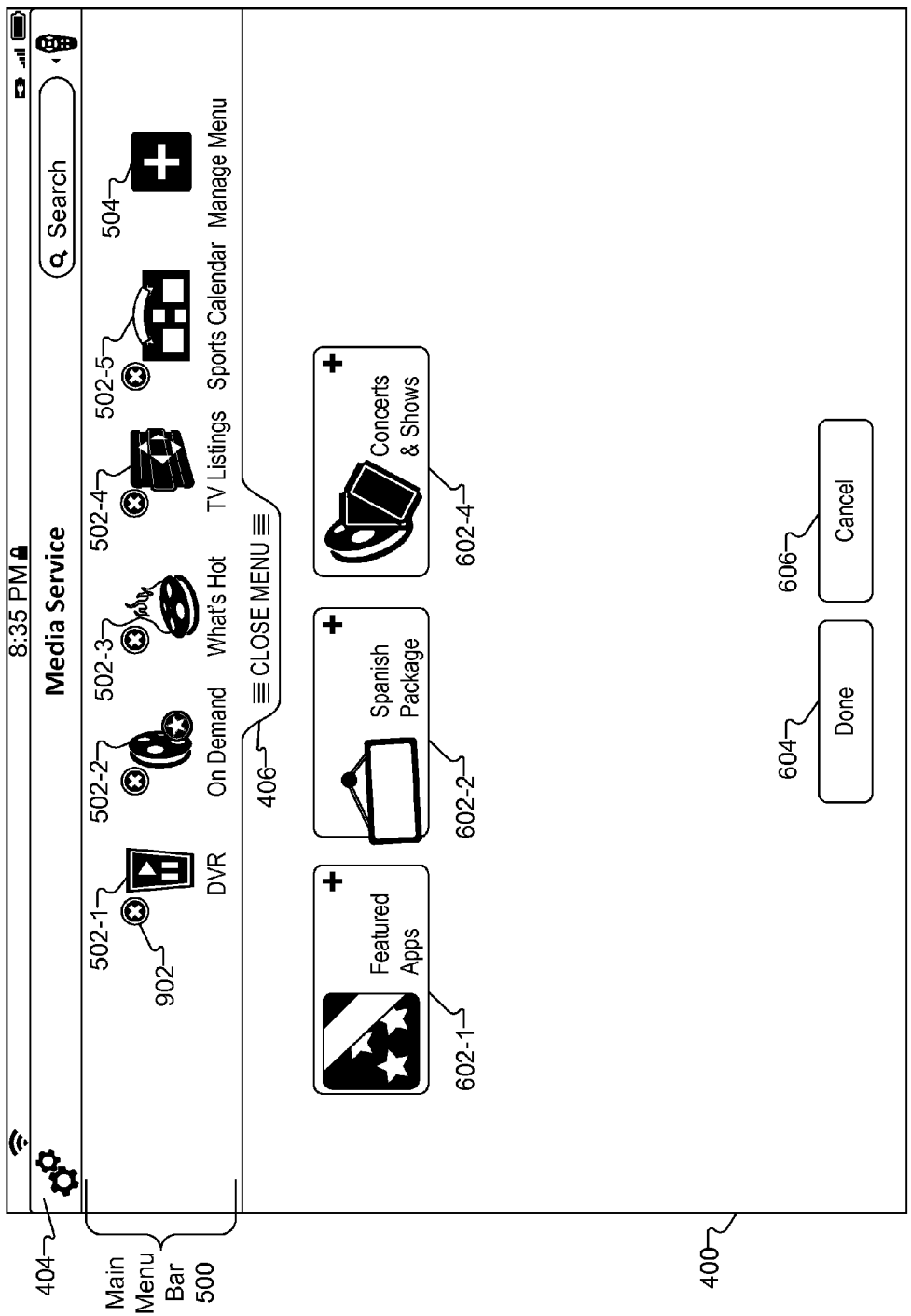

In certain examples, a visual cue indicating that the customization tool for rearranging menu objects is active may be presented to a user. FIG. 9 illustrates an exemplary view of GUI 400 with the menu-object-repositioning customization tool activated to facilitate rearrangement of one or more menu objects 502 in main menu bar 500. In FIG. 9, a visual cue is presented to indicate that the tool is active. In the illustrated example, the visual cue includes an "X" symbol displayed adjacent to each menu object 502. For example, an "X" symbol 902 is displayed next to menu object 502-1.

Figure 10:
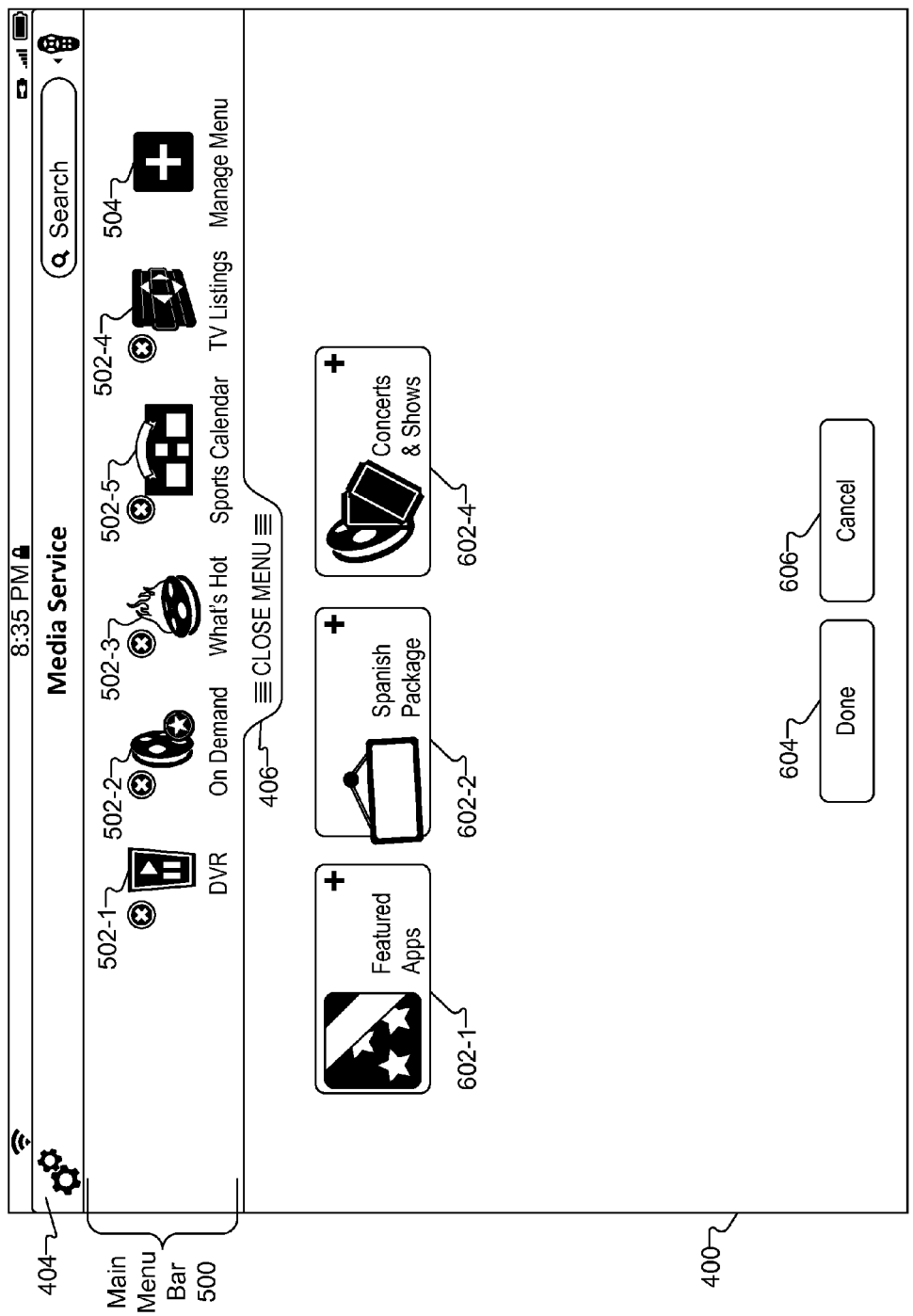

With this tool active, the user may provide input to rearrange the positions of menu objects 502 within main menu bar 500. For example, the user may drag menu object 502-5 from its current position in main menu bar 500 to another position in main menu bar 500. FIG. 10 illustrates an exemplary view of GUI 400 after menu object 502-5 has been repositioned by the user within main menu bar 500.

The rearrangement customization tool may additionally or alternatively facilitate deletion of one or more menu objects 502 from main menu bar 500. For example, the symbol 902 may be selected by the user to remove the menu object 502-1 from main menu bar 500.

As another example, the customization tool may be configured to allow the user to provide input to drag a menu object 502 from main menu bar 500 to remove the feature model represented by the menu object 502 from main menu bar 500. For example, the user may drag menu object 502-1 from main menu bar 500 to the area in GUI 400 in which customization menu objects 602 are displayed to remove the DVR feature module from main menu bar 500.

Figure 11:
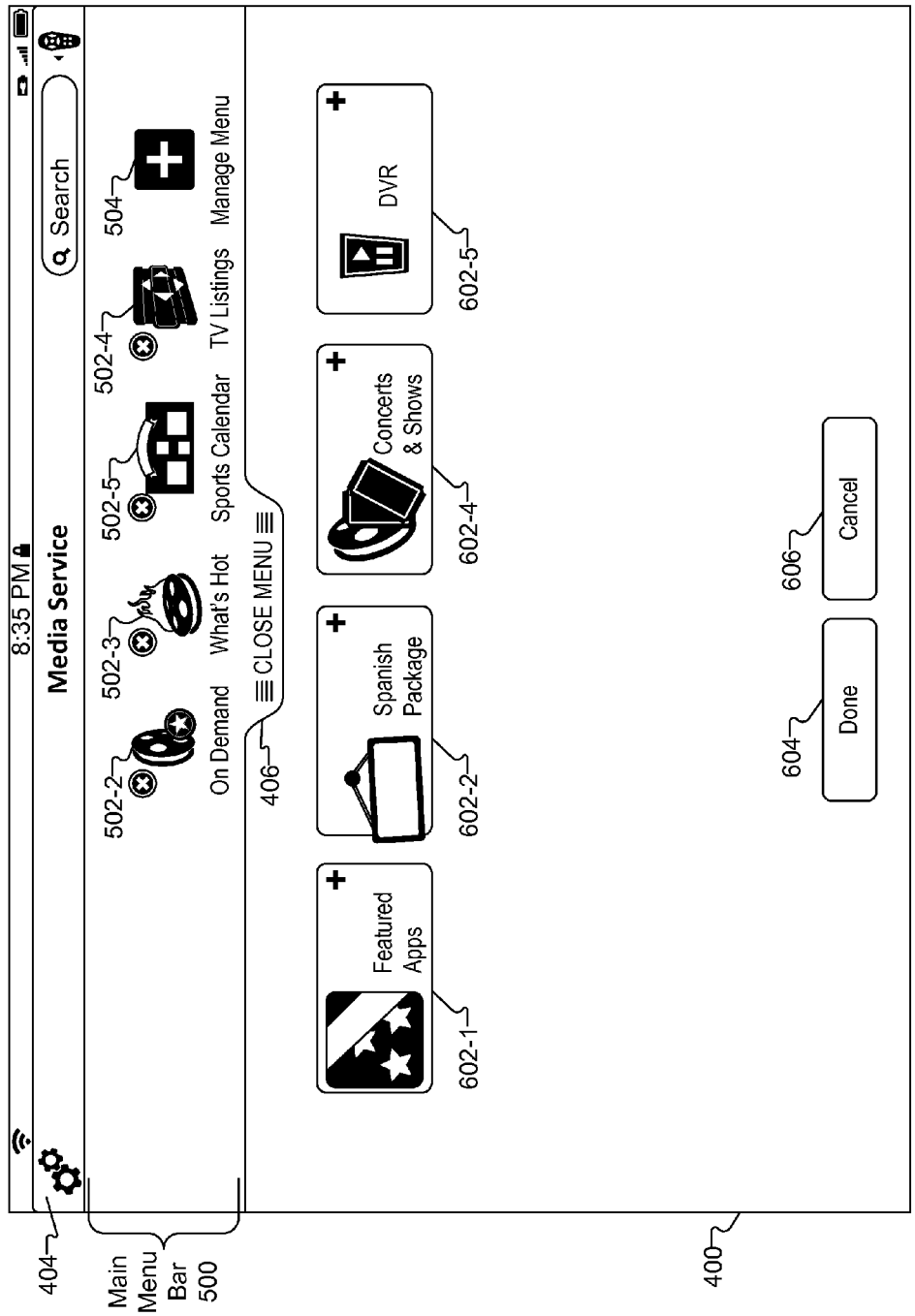

FIG. 11 illustrates an exemplary view of GUI 400 after the DVR feature module has been removed from main menu bar 500. As shown, a customization menu object 602-5 representing the DVR feature module is now displayed in the set of customization menu objects 602 in GUI 400.

After the user has finished customizing main menu bar 500 during operation in main menu customization mode, the user may select object 604 to save the customizations. In response, customization facility 204 may exit the main menu customization mode and perform one or more operations to implement the customizations. For example, customization facility 204 may communicate data representative of the customizations to user interface operation facility 202, which may modify one or more user interface settings such that user interface operation facility 202 is configured to generate and provide main menu bar 500 for presentation in GUI 400 during operation in operation mode and in accordance with the end-user customizations of main menu bar 500. This may include selecting and/or positioning menu objects 502 in main menu bar 500 in accordance with a customization of main menu bar 500 defined by the end user of the media service 102.

Figure 12:
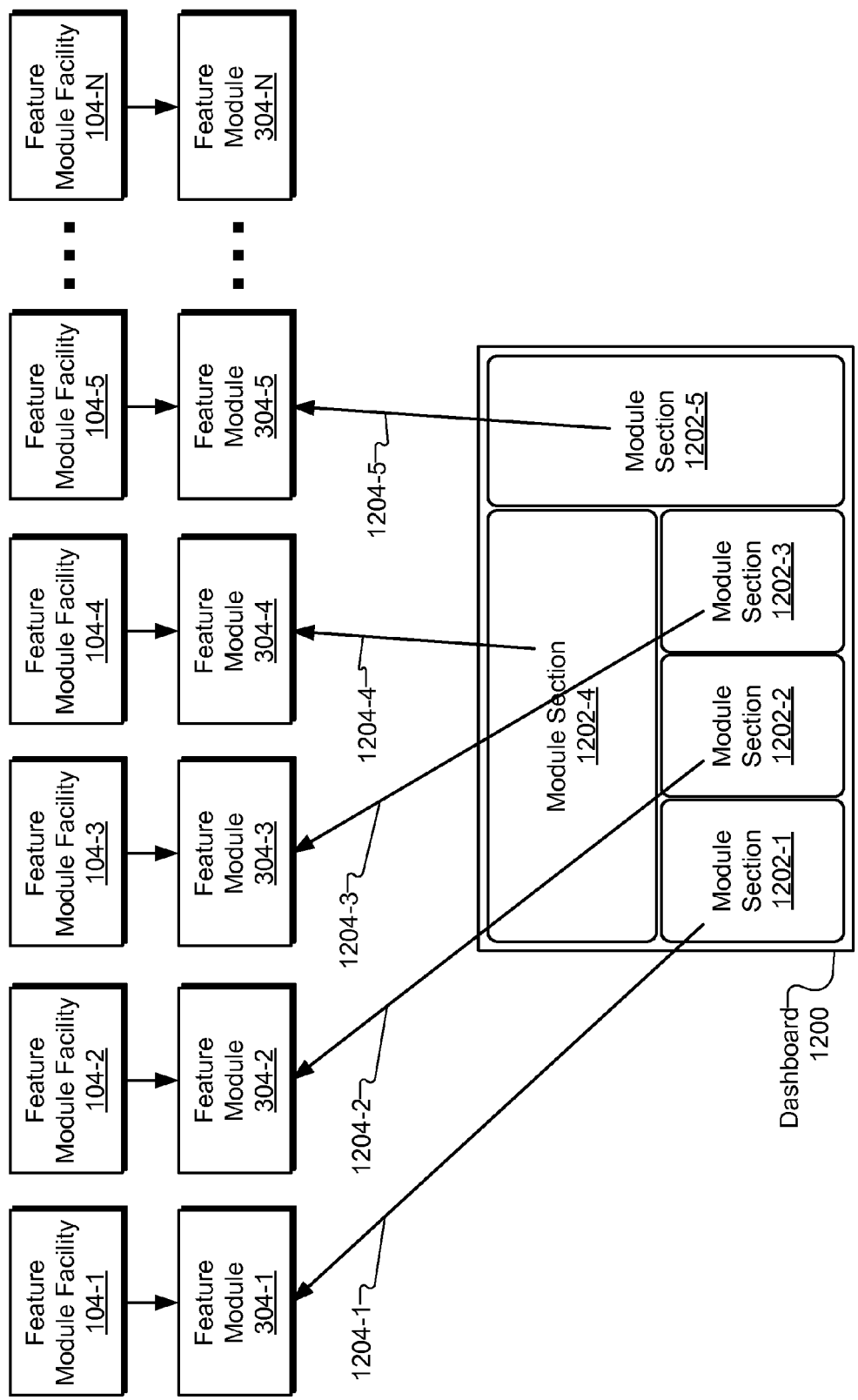
FIG. 12 illustrates an exemplary dashboard that includes feature module sections associated with a set of feature modules of a media service according to principles described herein.

FIG. 12 illustrates an example of a media service dashboard 1200 ("dashboard 1200") that includes a set of feature module sections 1202 (e.g., feature module sections 1202-1 through 1202-5) each linked to a different feature module included in the set of features modules 304 of the media service 102. As shown, feature module facilities 104 may provide respective feature modules 304 of the media service 102, and the set of feature module sections 1202 included in the dashboard 1200 may be linked to any set of the feature modules 304. In the illustrated example, the set of feature module sections 1202 are linked to a subset of the feature modules 304 that includes the feature module 304-1 provided by feature module facility 104-1, the feature module 304-2 provided by feature module facility 104-2, the feature module 304-3 provided by feature module facility 104-3, the feature module 304-4 provided by feature module facility 104-4, and the feature module 304-5 provided by feature module facility 104-5. Arrows 1204 (e.g., arrows 1204-1 through 1204-5) represent the respective links between feature module sections 1202-1 through 1202-5 and feature modules 304-1 through 304-5.

A link may be in any form suitable to map a particular feature module section 1202 to a particular feature module 304 such that a user selection of the feature module section 1202 will initiate the performance of one or more operations related to the feature module 304. For example, the particular feature module section 1202 may be configured for user selection to launch the particular feature module 304 (e.g., by launching a user interface dedicated to the particular feature module 304) to which the feature module section 1202 is linked. To this end, the link between the feature module section 1202 and the feature module 304 may indicate that the feature module 304 is to be launched in response to a user selection of the feature module section 1202 linked to the feature module 304.

A feature module section 1202 may include any defined area in dashboard 1200 in which feature content from the feature module 304 represented by the feature module section 1202 may be presented. A feature module section 1202 may be populated with feature content provided by the feature module facility 104 providing the feature module 304 represented by the feature module section 1202. The feature content may include static feature content (e.g., unchanging feature content such as a title, description, and/or logo associated with the feature module). The feature content may additionally or alternatively include dynamic feature content, which may include feature content that is dynamically selected and/or updated based on one or more factors such as a context within which dashboard 1200 is presented (e.g., based on a media service GUI within which dashboard 1200 is presented), a passage of time, a change in feature content based on operations of the corresponding feature module facility 104, operations of a feature module, and/or any other suitable factors.

For example, for a DVR feature module, feature content may be dynamically updated based on operations such as recording of a media program, viewing of a media program, deleting of a media program from memory, and/or any other operation of the DVR feature module. To illustrate, user interface operation facility 202 may be configured to select DVR feature content with which to populate a feature module section 1202 in dashboard 1200 based on predefined factors. In certain examples, the factors may specify that information about recordings of a particular television series is to be prioritized over recordings of other television series. The factors may further specify that the information about recordings of the particular television service be prioritized chronologically to first select older-in-time episodes that have not yet been played back for viewing. Thus, the feature module section 1202 may be populated with feature content in the form of information about a number of the next chronological episodes of a television series that have been recorded but have not yet been played back.

The feature content may be dynamically updated. For example, after any of the next chronological episodes of the television series is played back, the feature content may be dynamically updated to include information about a different set of episodes of the television series.

Customization facility 204 may be configured to provide one or more customization tools configured for use by an end user of the media service 102 to customize dashboard 1200. The tools may be launched for use by the user in any suitable way. For example, when the user provides predefined input during display of a view of dashboard 1200, such as a prolonged touch input within a view of dashboard 1200 and having a duration that satisfies a predefined duration for example, customization facility 204 may launch a dashboard customization mode. During operation in the dashboard customization mode, customization facility 204 may provide one or more tools configured to facilitate user customization of dashboard 1200, receive customization input from the user, and customize dashboard 1200 based on the input.

One or more dashboard customization tools may be configured for use by the user to define a feature content selection heuristic for a feature module section 1202 included in dashboard 1200. The feature content selection heuristic may be defined by the user to specify one or more factors upon which selection of feature content for inclusion in the feature module section 1202 is based. Accordingly, during operation in the dashboard customization mode, the user may define a feature content selection heuristic configured to direct user interface operation facility 202 operating in an operation mode to select feature content for inclusion in a feature module section 1202 based on the customization of the feature content selection heuristic defined by the user. For example, a user may define factors for populating a DVR feature module section 1202 with select DVR feature content (e.g., information about a favorite media program), a sports calendar feature module section 1202 with select sports calendar information (e.g., information about a favorite team), and a television listings feature module section 1202 with information about select television channels and/or television programs (e.g., favorites television channels and/or programs).

Additionally or alternatively, one or more dashboard customization tools may be configured for use by the user to define a customized visual layout of feature module sections 1202 in dashboard 1200. The tools may allow the user to add new feature module sections 1202, remove feature module sections 1202, reposition feature module sections 1202, and/or resize feature module sections 1202 within dashboard 1200, for example. Examples of dashboard customization tools will now be described.

Figure 13:
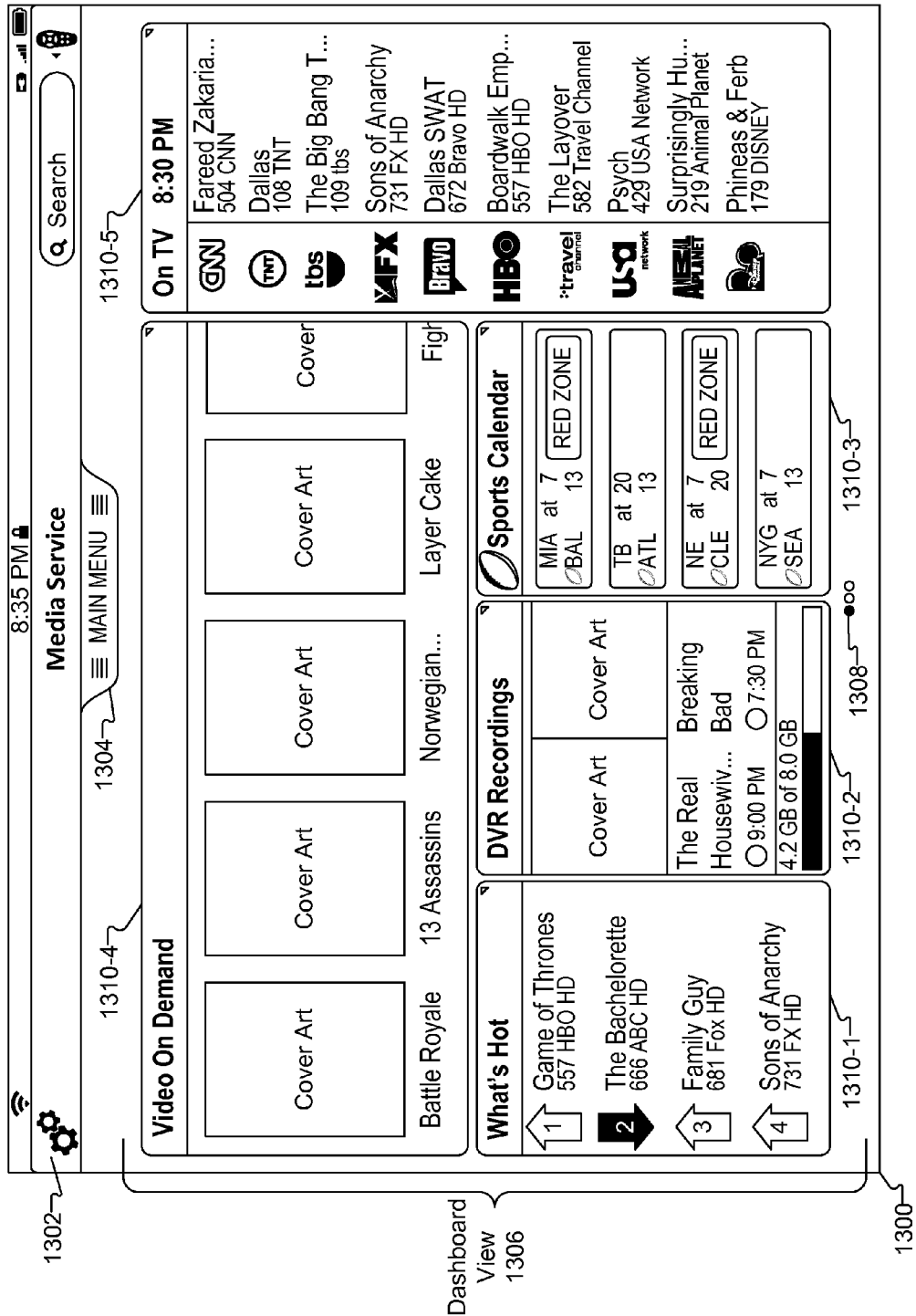
FIGS. 13-16 illustrate exemplary views of a media service graphical user interface according to principles described herein.

FIG. 13 illustrates an exemplary view of a GUI 1300 associated with the media service 102. As shown, GUI 1300 may include a horizontal header bar 1302 positioned across and/or near the top of GUI 1300. Immediately below the header bar 1302, a main menu tab 1304 may be displayed. When positioned in a closed position as shown in FIG. 13, main menu tab 1304 may be configured for user selection (e.g., by a pull-down touch gesture) to launch a display of a main menu bar, such as any of the main menu bars described herein, in GUI 1300.

GUI 1300 may include a media service dashboard view 1306, which may be displayed below header 1302 and main menu tab 1304 as shown in FIG. 13. Dashboard view 1306 may include a view of all or part of a dashboard associated with the media service 102. In the illustrated example, dashboard view 1306 is a view of a first page of a three-page media service dashboard. GUI 1300 includes a dashboard page indicator 1308 that visually indicates which page of the media service dashboard is displayed in GUI 1300. In the illustrated example, indicator 1308 indicates and a first page of a three-page dashboard is displayed in GUI 1300. A user may provide any suitable input to navigate different pages of the dashboard in and/or out of dashboard view 1306.

Dashboard view 1306 may include a set of feature module sections 1310 (e.g., feature module sections 1310-1 through 1310-5) positioned as shown in FIG. 13. In the illustrated example, the feature module sections 1310 represent feature modules 304 labeled as "What's Hot," "DVR Recordings," "Sports Calendar," "Video on Demand," and "On TV" feature modules 304.

In certain examples, each feature module section 1310 included in dashboard view 1306 may include a presentation of feature content associated with the feature module 304 respectively represented by the feature module section 1310. For example, feature module section 1310-1 includes information about popular media programs, feature module section 1310-2 includes information about DVR recordings, feature module section 1310-3 includes information about sporting events, feature module section 1310-4 includes information about video-on-demand programs, and feature module section 1310-5 includes information about television programming.

As mentioned, customization facility 204 may be configured to provide one or more customization tools for use by an end user of the media service 102 to customize a media service dashboard. For example, while dashboard view 1306 is displayed in GUI 1300 as shown in FIG. 13, the user may provide input to launch a dashboard customization mode. Customization facility 204 may detect the input and respond by launching the dashboard customization mode to provide one or more tools for use by the user to customize the media service dashboard. Dashboard customization mode may include customization facility 204 operating in any way suitable to facilitate customization of the media service dashboard by an end user of the media service 102.

In certain examples, the launching of the dashboard customization mode may include customization facility 204 identifying feature modules 304 represented by feature module sections 1310 in the media service dashboard and initiating a presentation of a customization object representing each feature module identified as being represented by a feature module section 1310 in the media service dashboard. The customization objects may be presented during operation in the dashboard customization mode.

Figure 14:
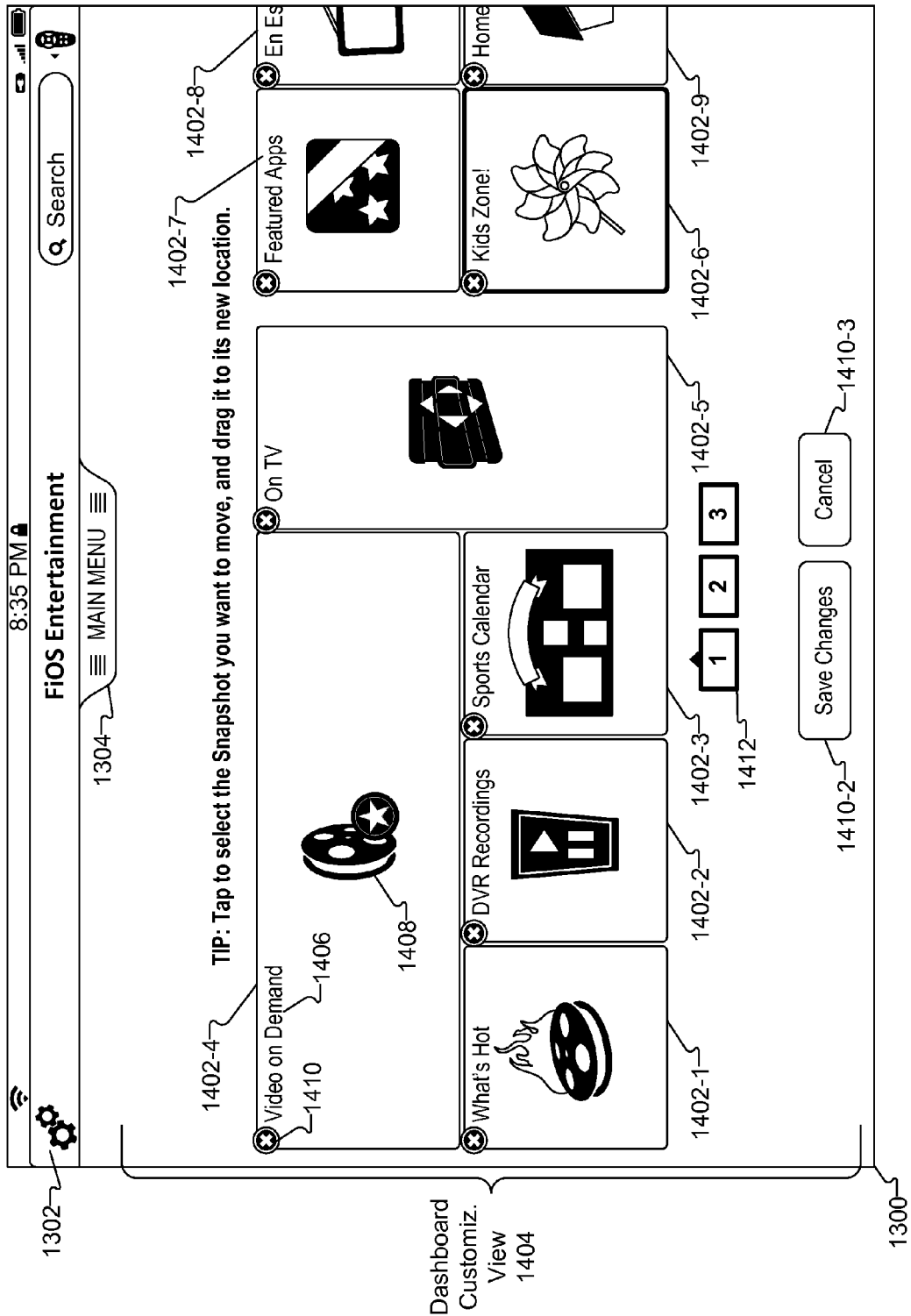

The customization objects may be presented at positions that reflect the positioning of the corresponding feature module sections 1310 in the media service dashboard. For example, FIG. 14 illustrates an exemplary view of GUI 1300 in which a set of customization objects 1402 (e.g., customization objects 1402-1 through 1402-9) may be displayed in a dashboard customization view 1404 at positions that coincide with the positioning, in the media service dashboard, of the feature module sections 1310 represented by the customization objects 1402.

A customization object 1402 may include any content visually representative of a feature module 304 represented by the customization object 1402. For example, a customization object 1402 may include a title, description, and/or logo associated with the feature module 304 represented by customization object 1402. In FIG. 14, for instance, customization object 1402-4 includes a title 1406 and a logo image 1408 associated with the feature module 304 represented by customization object 1402-4.

A symbol may be presented adjacent to each customization object 1402 to further indicate operation in dashboard customization mode and/or one or more dashboard customization tools available for use by the user. In FIG. 14, for example, an "X" symbol is displayed next to each customization object 1402. With respect to customization object 1402-4, an "X" symbol 1410 is displayed and is configured for user selection to initiate a removal of customization object 1402-4, and consequently a removal of the corresponding feature module section 1310, from the media service dashboard.

In dashboard customization view 1404, customization objects 1402-1 through 1402-5 represent a first page of the media service dashboard and customization objects 1402-6 through 1402-9 represent part of a second page of the media service dashboard. A dashboard page indicator 1412 indicates which page of the media service dashboard is primarily represented in dashboard customization view 1404 during operation in the dashboard customization mode. In FIG. 14, dashboard page indicator 1412 indicates that the first page of the media service dashboard is primarily represented in dashboard customization view 1404.

Figure 15:
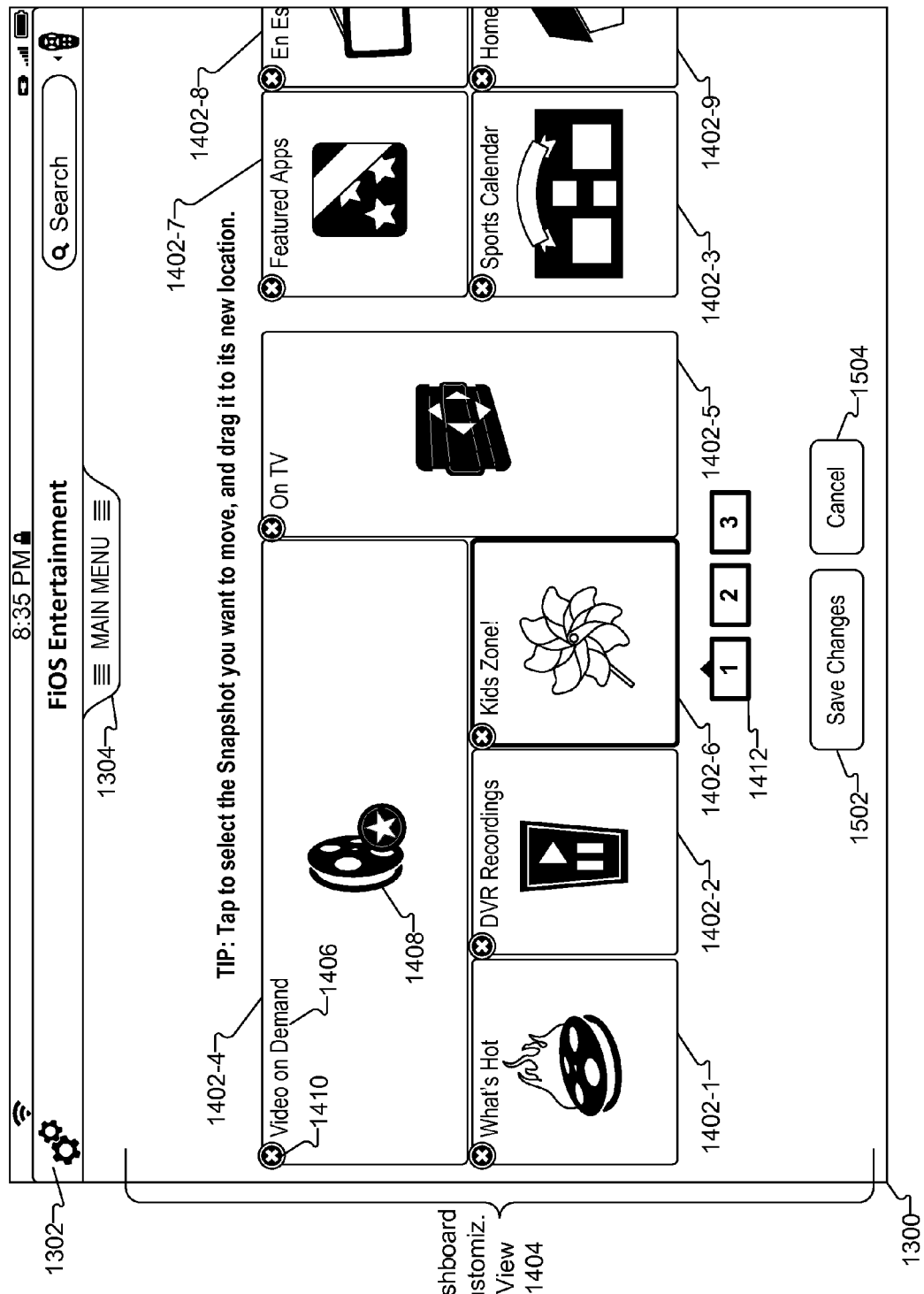

During operation in the dashboard customization mode, one or more dashboard customization tools may be provided for user by a user to reposition customization objects 1402 within the media service dashboard, thereby changing the layout of feature module sections 1310 in the media service dashboard. For example, with dashboard customization view 1404 displayed, a user may provide input to drag and drop customization objects 1402 to different positions in the media service dashboard. To illustrate, a user may want to move customization object 1402-6 representing a "Kid's Zone!" feature module 304 from the second page to the first page of the media service dashboard. The user may provide input to drag customization object 1402-6 from its current position on the second page to a new position on the first page of the media service dashboard. For example, the user may drag customization object 1402-6 such that customization object 1402-6 hovers over customization object 1402-3. If the user holds customization object 1402-6 over customization object 1402-3 for a predefined duration, customization facility 204 may swap the positions of customization object 1402-6 and customization object 1402-3 such that customization object 14002-6 is now positioned on the first page of the media service dashboard where customization object 1402-3 used to be positioned, and customization object 1402-3 is now positioned on the second page of the media service dashboard where customization object 1402-6 used to be positioned. FIG. 15 illustrates an exemplary view of GUI 1300 after this position swap of customization object 1402-6 and customization object 1402-3 has been made.

The launching of the dashboard customization mode may also include initiating a display of user-selectable options to exit the dashboard customization mode. For example, as shown in FIG. 15, dashboard customization view 1404 may include a "Save Changes" option 1502 configured to be selected by a user to save customizations made during operation in the dashboard customization mode and exit the dashboard customization mode. For example, a user selection of option 1502 during display of the dashboard customization view 1404 shown in FIG. 15 may cause customization facility 204 to save the customization that repositioned customization objects 1402-6 and 1402-3. Dashboard customization view 1404 may also include a "Cancel" option 1504 configured to be selected by a user to exit the dashboard customization mode without saving any customizations made during operation in the dashboard customization mode.

After the user has finished customizing the media service dashboard during operation in dashboard customization mode, the user may select object 1502 to save the customizations. In response, customization facility 204 may exit the dashboard customization mode and perform one or more operations to implement the customizations. For example, customization facility 204 may communicate data representative of the customizations to user interface operation facility 202, which may modify one or more user interface settings such that user interface operation facility 202 is configured to generate and provide the media service dashboard for presentation in GUI 1300 during operation in operation mode and in accordance with the end-user customizations of the media service dashboard. This may include selecting and/or positioning feature module sections 1310 in dashboard view 1306 in accordance with a customization of the media service dashboard defined by the end user of the media service 102.

Figure 16:
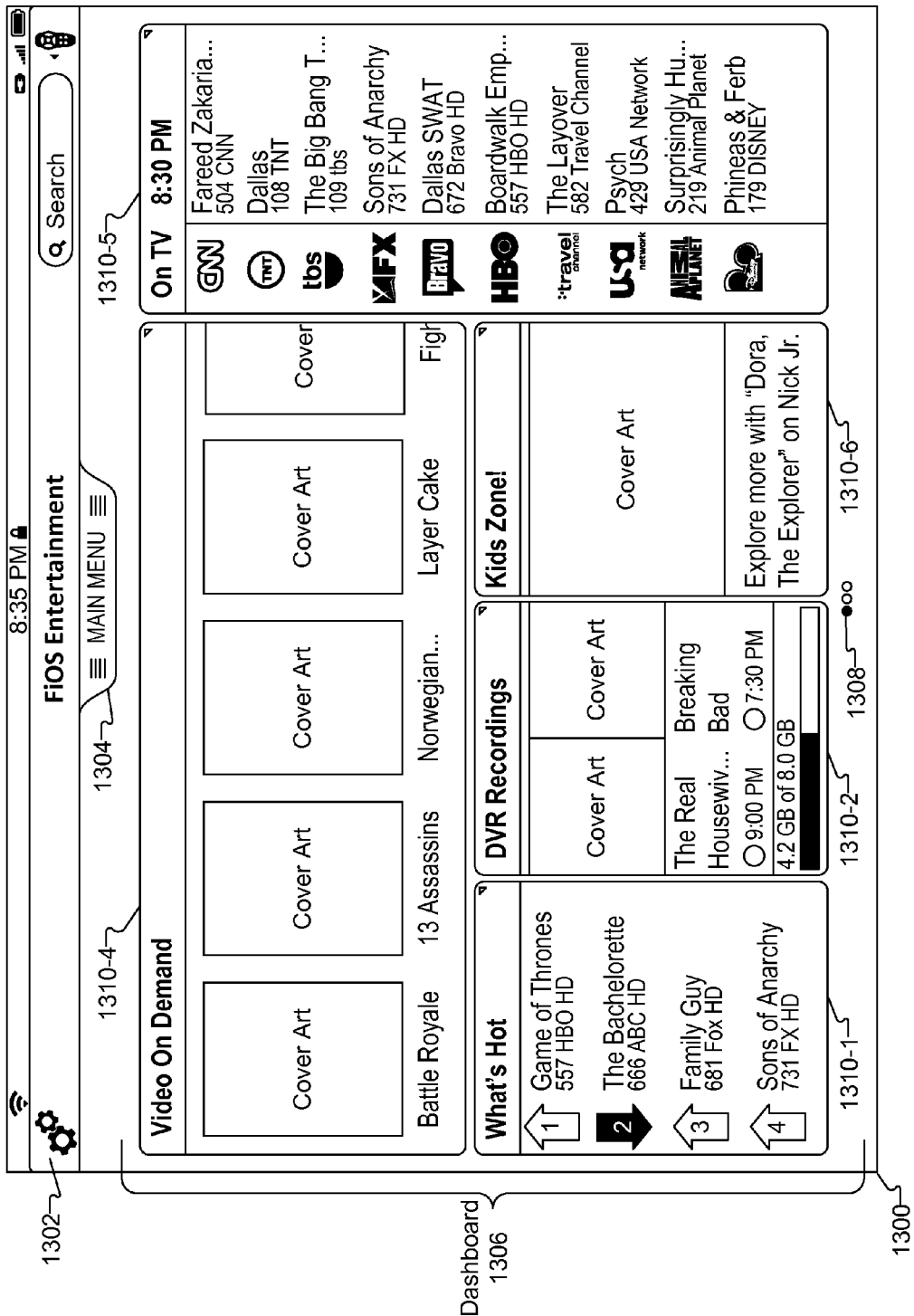

FIG. 16 illustrates an exemplary view of GUI 1300 in which dashboard view 1306 is displayed in accordance with one or more end-user-defined customizations of the media service dashboard. In FIG. 16, for example, a new feature module section 1310-6 representing a "Kid's Zone" feature module 304 is now included and positioned where feature module section 1310-3 was previously positioned.

In certain examples, main menu bar 500 and dashboard 1200 associated with the media service 102 may be customized by an end user to represent different sets of feature modules 304 of the media service 102. In other examples, main menu bar 500 and dashboard 1200 may be customized by an end user to represent the same set of feature modules 304 of the media service 102. Views of main menu bar 500 and dashboard 1200 may be presented alone or together in a media service GUI view.

Figure 17:
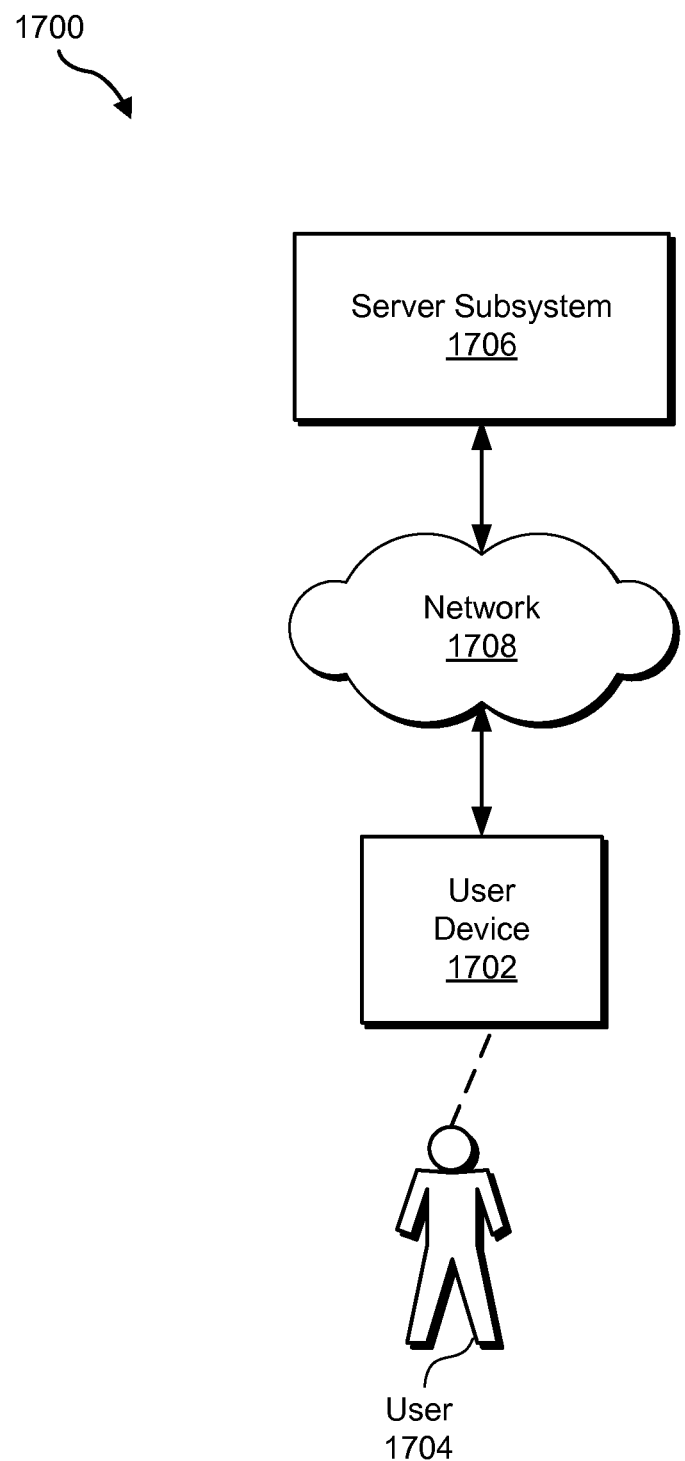
FIGS. 17-18 illustrate exemplary implementations of the system of FIG. 1 and/or the system of FIG. 2 according to principles described herein.

FIG. 17 illustrates an exemplary implementation 1700 of system 100 and/or system 200. As shown, implementation 1700 may include a user device 1702 associated with a user 1704. User computing device 1702 may be in communication with a server subsystem 1706. In implementation 1700, one or more facilities 102-108 of system 100 and/or one or more facilities 202-204 of system 200 may be implemented entirely by user device 1702, entirely by server subsystem 1706, or distributed across user device 1702 and server subsystem 1706. As an example, a client application installed and executing on user device 1702 may be configured to direct user device 1702 to perform one or more operations described herein. As another example, server subsystem 1706 may be configured to perform one or more operations described herein and direct user device 1702 (e.g., a web browser installed and executing on user device 1702) to present any of the GUI views described herein.

User device 1702 and server subsystem 1706 may communicate using any communication platforms and technologies suitable for transporting data (e.g., media content data 110, feature content data 112, and/or user interface data 114) and/or communication signals, including known communication technologies, devices, media, and protocols supportive of remote communications, examples of which include, but are not limited to, data transmission media, communications devices, Transmission Control Protocol ("TCP"), Internet Protocol ("IP"), Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, wireless communication technologies, Internet communication technologies, media streaming technologies, and other suitable communications technologies.

In certain embodiments, user device 1702 and server subsystem 1706 may communicate via a network 1708. Network 1708 may include one or more networks, such as one or more wireless networks (Wi-Fi networks), wireless communication networks, mobile telephone networks (e.g., cellular telephone networks), the Internet, local area networks, wide area networks, and any other networks capable of carrying data and/or communications signals between user device 1702 and server subsystem 1706. Communications between user device 1702 and server subsystem 1706 may be transported using any one of the above-listed networks, or any combination or sub-combination of the above-listed networks. Alternatively, user device 1702 and server subsystem 1706 may communicate in another way such as by one or more direct connections between user device 1702 and server subsystem 1706.

Server subsystem 1706 may include one or more computing devices, such as one or more server devices remotely located from user device 1702, configured to perform one or more of the operations described herein. User device 1702 may include a computing device associated with (e.g., operated by) user 1704 and configured to perform one or more of the operations described herein. For example, user device 1702 may include a tablet computer, smart phone device, a set-top box device, a television device, a media player device, or any other device capable of presenting a media service user interface for use by user 1704 (e.g., by displaying a media service GUI on a display screen).

Figure 18:
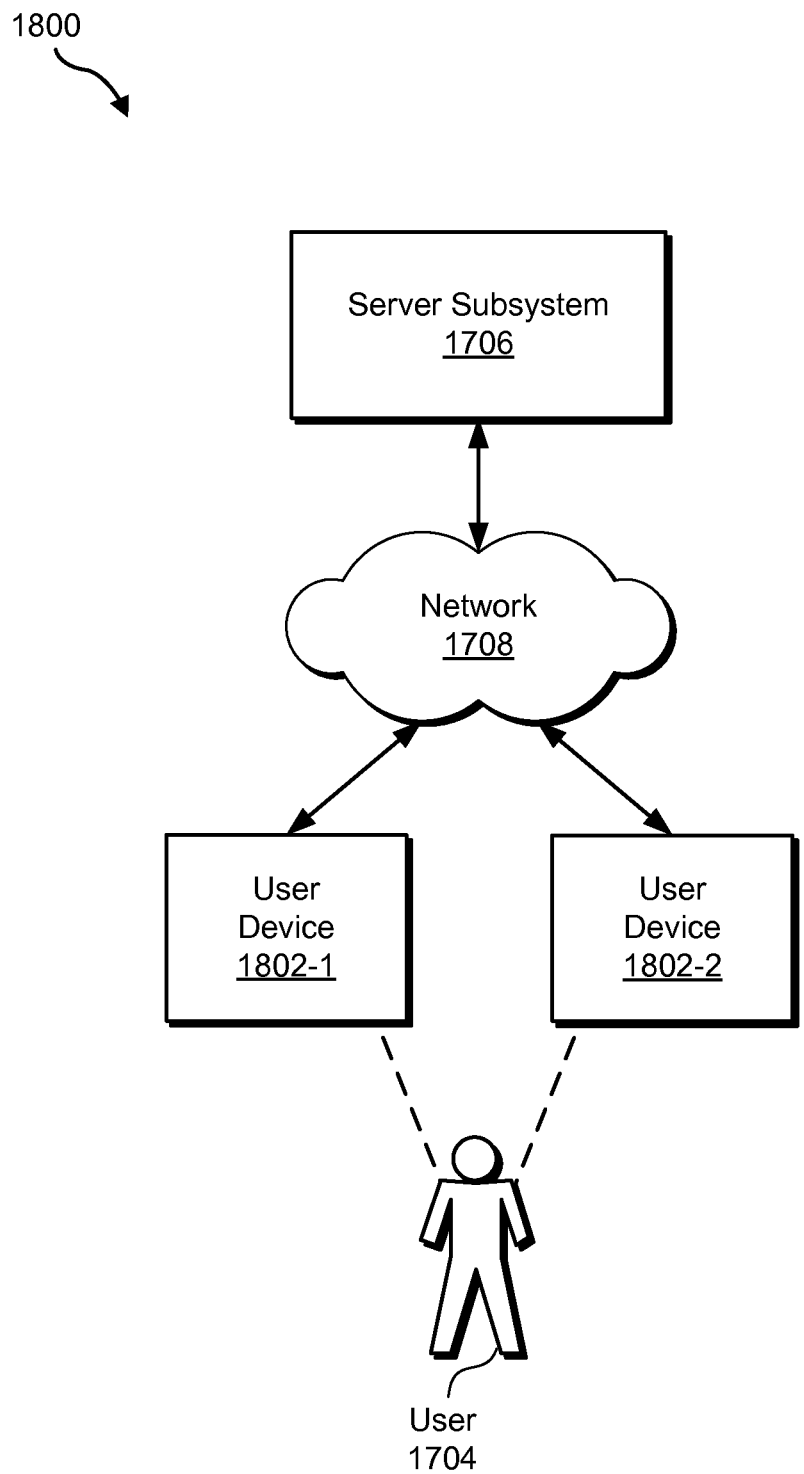

FIG. 18 illustrates another exemplary implementation 1800 of system 100 and/or system 200. As shown, implementation 1800 may include multiple user devices 1802, such as user devices 1802-1 and 1802-2, associated with user 1704. One or more of the user devices 1802 may be in communication with server subsystem 1706, such as by way of network 1708. Each of the user devices 1802 may be configured to operate in any of the ways described herein to access the media service 102.

In certain examples, user device 1802-1 may function as a primary device for use by user 1704 to access the media service 102 and user device 1802-2 may function as a secondary or companion device for use by user 1704 to access the media service 102, to access information related to the media service 102 (e.g., television programming information), and/or to control the primary device. For example, user device 1802-1 may include a set-top box device, television device, or personal computer used by user 1704 as a primary device for accessing the media service. For instance, user device 1802-1 may be preferred by user 1704 to consume media service content when the user 1704 is at home. User device 1802-2 may include a mobile device such as a tablet computer, mobile phone, or other similar device used by user 1704 as a second device for accessing the media service 102, accessing information about the media service 102, and/or for controlling operations of user device 1802-1. For instance, user device 1802-2 may be configured to function as a virtual remote control device to virtually control operations of user device 1802-1.

In certain examples, user 1704 may utilize user device 1802-2 to define customizations of main menu bar 500 and/or dashboard 1200 in any of the ways described herein. Customization facility 204 may implement the defined customizations in a user interface provided by user device 1802-2. In addition, customization facility 204 may implement the same defined customizations in a user interface provided by user device 1802-1. Accordingly, user interfaces provided separately and independently of one another by user devices 1802 may maintain uniformity in customizations without user 1704 having to provide input to customize each user interface separately.

Figure 19:
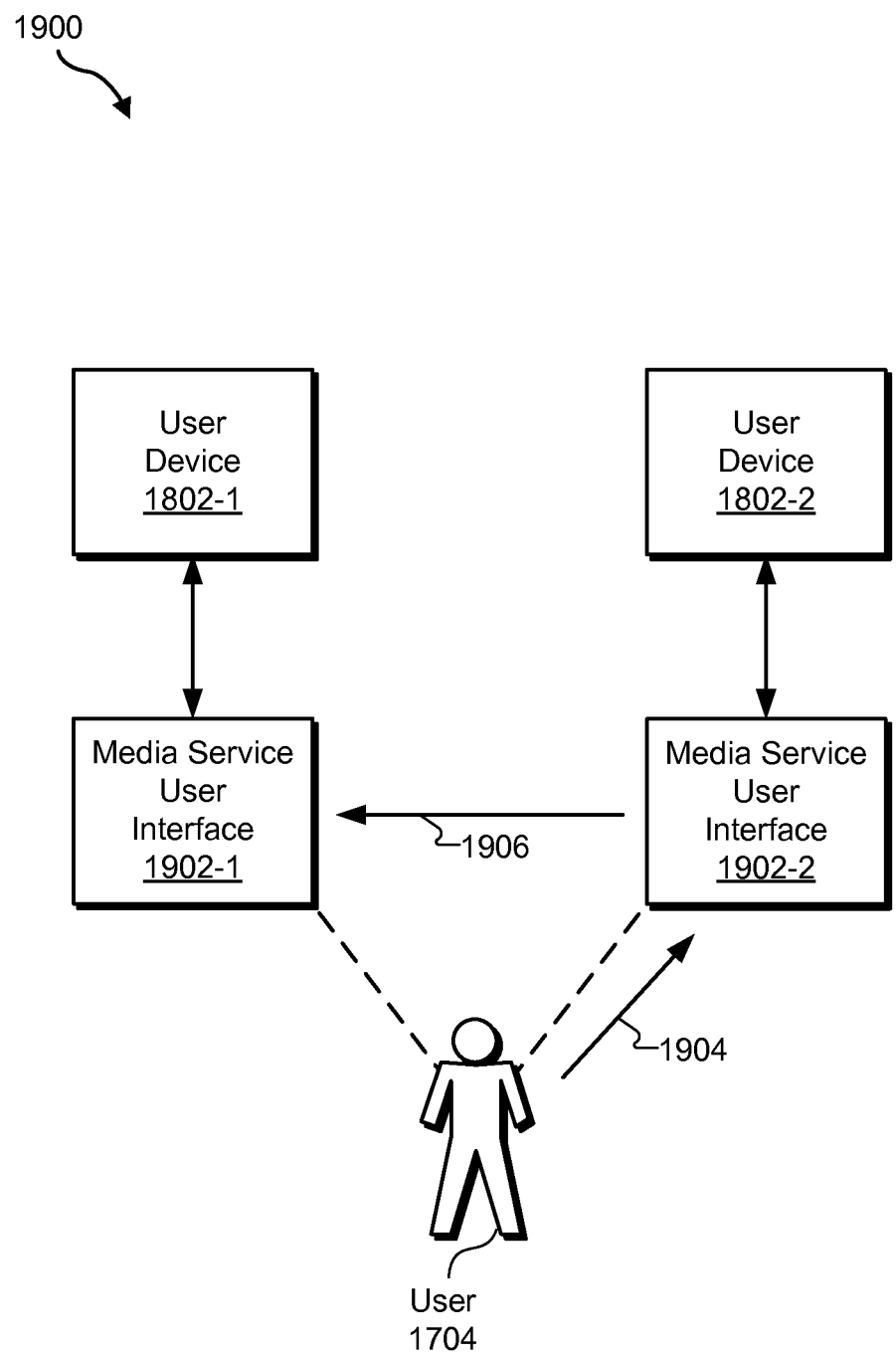
FIG. 19 illustrates an exemplary configuration in which end-user-defined customizations of a media service user interface and propagated to another media service user interface according to principles described herein.

To illustrate, FIG. 19 shows a configuration 1900 in which user device 1802-1 provides a first media service user interface 1902-1 and user device 1802-2 provides a second media service user interface 1902-2 for use by user 1704 to interact with the media service 102. User 1704 may utilize user interface 1902-2 to provide customizations to user interface 1902-2 in any of the ways described herein. This is represented by arrow 1904 in FIG. 19. Customization facility 204 may implement the customizations in media service user interface 1902-2. In addition, customization facility 204 may automatically propagate the customization into media service user interface 1902-1, which is illustrated by arrow 1906 in FIG. 19. This automatic propagation of the customizations may be convenient to user 1704, especially in cases in which media service user interface 1902-2 (e.g., a touch screen user interface) is more convenient to use to define the customizations than is media service user interface 1902-1 (e.g., a non-touch screen user interface such as a television and infrared remote control interface). The propagation may be performed in any suitable way, such as by user device 1802-2 communicating data representative of the customizations to user device 1802-1 (e.g., by way of a local area connection and/or network) and/or by user device 1802-2 communicating data representative of the customizations to server subsystem 1706, which then communicates data representative of the customizations to user device 1802-1.

Figure 20:
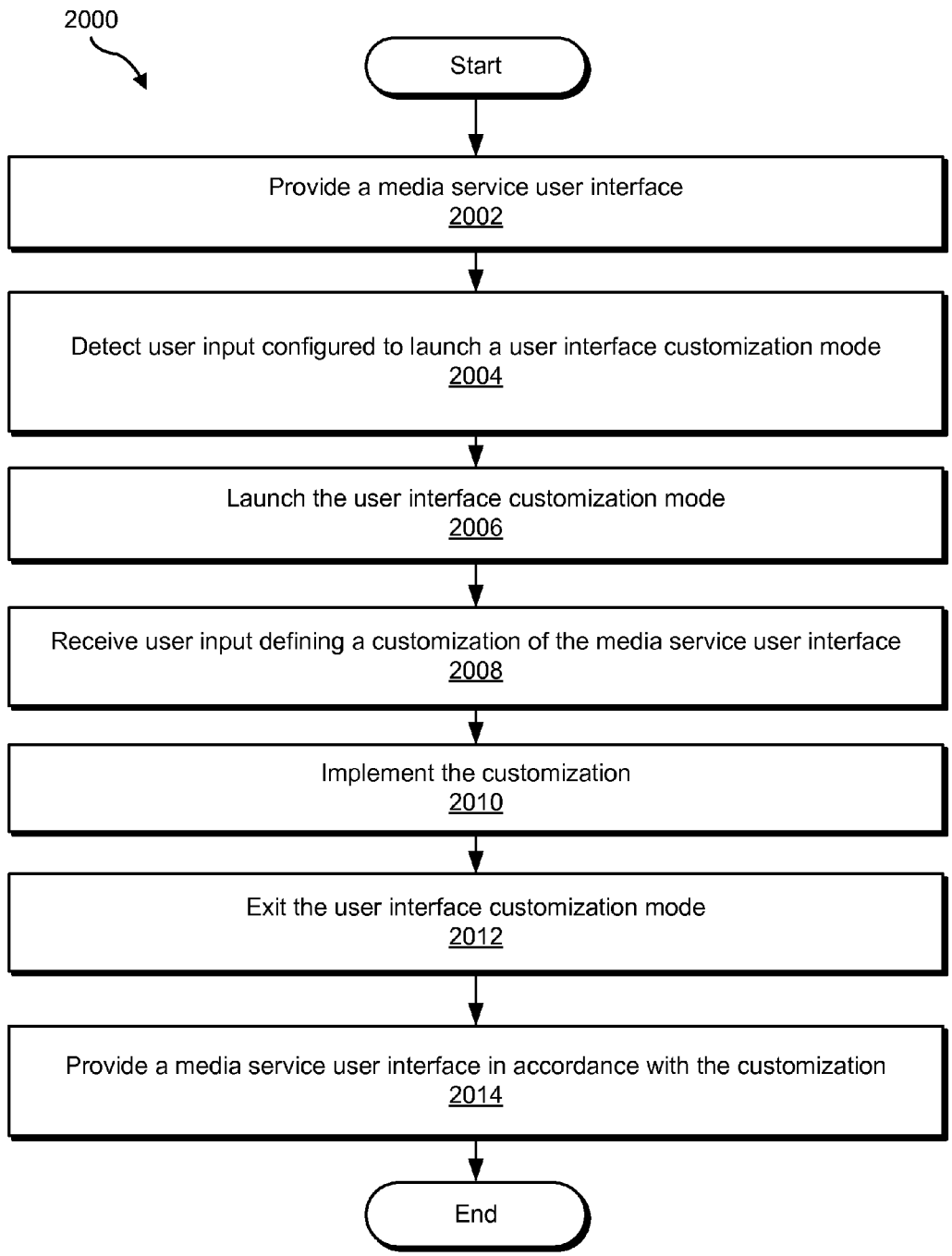
FIG. 20 illustrates an exemplary media service user interface method according to principles described herein.

FIG. 20 illustrates an exemplary media service user interface method 2000. While FIG. 20 illustrates exemplary steps according to one embodiment, other embodiments may omit, add to, reorder, combine, repeat, and/or modify any of the steps shown in FIG. 20. One or more of the steps shown in FIG. 20 may be performed by system 100, system 200, and/or any implementation and/or component thereof.

In step 2002, a media service user interface system ("system"), provides a media service user interface. Step 2002 may be performed in any of the ways described herein, such as by providing any of the exemplary media service GUIs described herein for display on a display screen of a user device associated with an end user of a media service.

In step 2004, the system detects user input configured to launch a user interface customization mode. Step 2004 may be performed in any of the ways described herein, such as by system detecting any of the exemplary user input described herein that is configured to launch any of the user interface customization modes described herein (e.g., a menu bar customization mode or a dashboard customization mode).

In step 2006, the system launches the user interface customization mode. Step 2006 may be performed in any of the ways described herein, such as by launching an operating in a menu bar customization mode or a dashboard customization mode as described herein.

In step 2008, the system receives user input defining a customization of the media service user interface. Step 2008 may be performed in any of the ways described herein, such as by the system receiving any of the exemplary customization-defining user input described herein.

In step 2010, the system implements the customization. Step 2010 may be performed in any of the ways described herein. In certain examples, step 2010 may include the system implementing the customization in the media service user interface (e.g., the same media service user interface through which the user input defining the customization is received in step 2008). In certain examples, step 2010 may additionally include the system automatically propagating the customization from the media service user interface to another media service user interface, such as another media service user interface provided by another user device associated with the end user of the media service, in any of the ways described herein.

In step 2012, the system exits the user interface customization mode. Step 2012 may be performed in any of the ways described herein and may result in a return to system operating in an operation mode.

In step 2014, the system provides a media service user interface in accordance with the customization. Step 2014 may be performed in any of the ways described herein and may include providing any customized version of any media service user interface provided by a user device associated with the end user of the media service.

One or more of the steps of method 2000 may be performed sequentially, performed in parallel, and/or repeated. For example, one or more steps may be repeated to receive and/or implement additional customizations of the media service user interface.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 21:
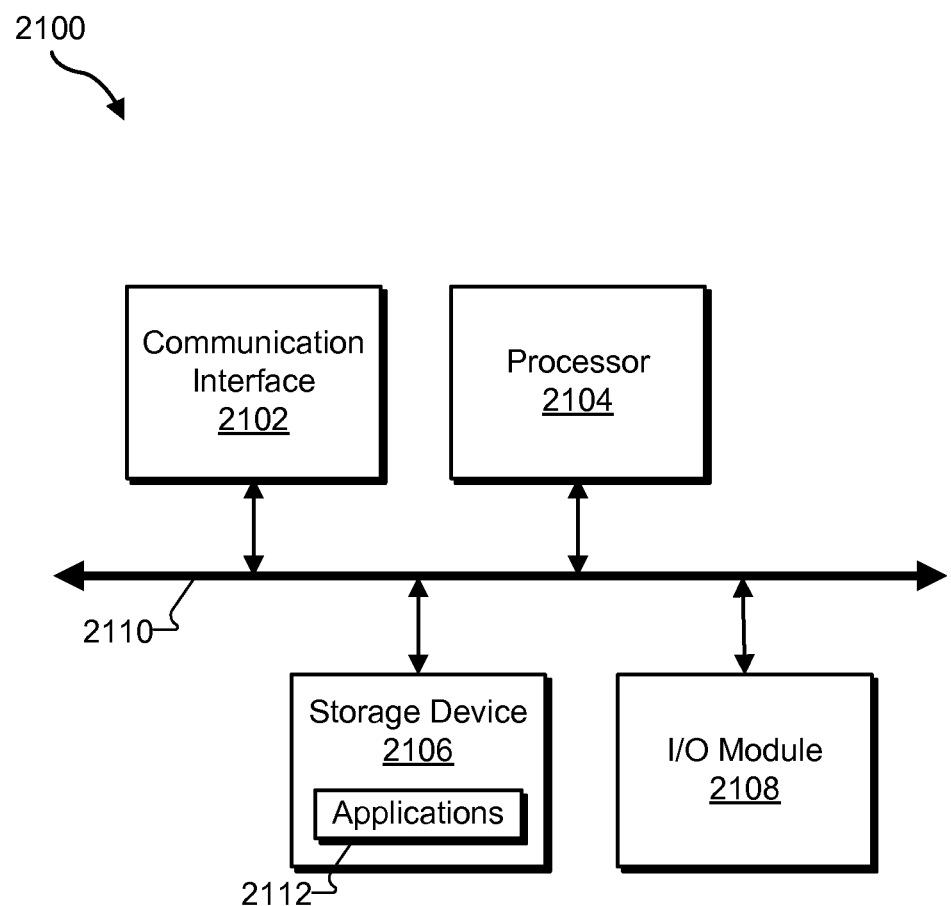
FIG. 21 illustrates an exemplary computing device according to principles described herein.

FIG. 21 illustrates an exemplary computing device 2100 that may be configured to perform one or more of the processes described herein. As shown in FIG. 21, computing device 2100 may include a communication interface 2102, a processor 2104, a storage device 2106, and an input/output ("I/O") module 2108 communicatively connected via a communication infrastructure 2110. While an exemplary computing device 2100 is shown in FIG. 21, the components illustrated in FIG. 21 are not intended to be limiting. Additional or alternative components may be used in other embodiments. Components of computing device 2100 shown in FIG. 21 will now be described in additional detail.

Communication interface 2102 may be configured to communicate with one or more computing devices. Examples of communication interface 2102 include, without limitation, a wired network interface (such as a network interface card), a wireless network interface (such as a wireless network interface card), a modem, an audio/video connection, and any other suitable interface.

Processor 2104 generally represents any type or form of processing unit capable of processing data or interpreting, executing, and/or directing execution of one or more of the instructions, processes, and/or operations described herein. Processor 2104 may execute and/or direct execution of operations as directed by one or more applications 2112 (which may include one or more software applications 102 included in suite 100) or other computer-executable instructions such as may be stored in storage device 2106 or another computer-readable medium.

Storage device 2106 may include one or more data storage media, devices, or configurations and may employ any type, form, and combination of data storage media and/or device. For example, storage device 2106 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 2106. For example, data representative of one or more executable applications 2112 configured to direct processor 2104 to perform any of the operations described herein may be stored within storage device 2106. In some examples, data may be arranged in one or more databases residing within storage device 2106.

I/O module 2108 may be configured to receive user input and provide user output and may include any hardware, firmware, software, or combination thereof supportive of input and output capabilities. For example, I/O module 2108 may include hardware and/or software for capturing user input, including, but not limited to, a keyboard or keypad, a touch screen component (e.g., touch screen display), a receiver (e.g., an RF or infrared receiver), and/or one or more input buttons.

I/O module 2108 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 2108 is configured to provide graphical data to a display for presentation to a user. The graphical data may be representative of one or more GUI views and/or any other graphical content as may serve a particular implementation.

In some examples, any of the facilities described herein may be implemented by or within one or more components of computing device 2100. For example, one or more applications 2112 residing within storage device 2106 may be configured to direct processor 2104 to perform one or more processes or functions associated with feature module facilities 104, user interface facility 106, user interface operation facility 202, and/or user interface customization facility 204. Likewise, storage facility 108 may be implemented by or within storage device 2106.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
providing, by a computer-implemented media service user interface system, a media service graphical user interface for display on a display screen of a user device associated with an end user of a media service, the media service graphical user interface including a horizontal header bar and a main menu bar that extends parallel to the horizontal header bar and that comprises:
a set of menu objects representing a set of feature modules of the media service, each menu object included in the set of menu objects selectable by the end user to launch a different feature module included in the set of feature modules, each menu object included in the set of menu objects arranged linearly with respect to each other along a horizontal line within the main menu bar; and
a menu bar management object arranged at a rightmost position with respect to each other menu object included in the set of menu objects that are arranged linearly with respect to each other along the horizontal line within the main menu bar, a placement of the menu bar management object being static at the rightmost position regardless of an input provided by the end user to horizontally scroll the set of menu objects within the main menu bar, the menu bar management object selectable by the end user to launch a menu bar customization mode that facilitates a customization of the main menu bar by the end user of the media service without navigating away from the main menu bar in the media service graphical user interface, the menu bar customization mode facilitating deletion, by the end user, of a menu object included in the set of menu objects either by way of a first user input selecting a delete symbol that is provided for display together with the menu object while in the menu bar customization mode or a second user input that includes the end user dragging the menu object out of the main menu bar;
detecting, by the computer-implemented media service user interface system, a user selection of a main menu tab associated with the main menu bar; and
transitioning, by the computer-implemented media service user interface system in response to the user selection of the main menu tab, the main menu bar from an open position in which the set of menu objects and the menu bar management object are displayed within the media service graphical user interface to a closed position in which the set of menu objects and the menu bar management object are not displayed within the media service graphical user interface;
wherein the main menu tab extends downwardly from the main menu bar when the main menu bar is in the open position and the main menu tab extends downwardly from the horizontal header bar when the main menu bar is in the closed position.

2. The method of claim 1, further comprising:
detecting, by the computer-implemented media service user interface system, a user selection of the menu bar management object; and
launching, by the computer-implemented media service user interface system in response to the detecting of the user selection of the menu bar management object, the menu bar customization mode.

3. The method of claim 2, wherein the launching of the menu bar customization mode comprises:
identifying a feature module of the media service that is not included in the set of feature modules represented by the set of menu objects in the main menu bar; and
initiating a presentation of a customization menu object in the media service graphical user interface, the customization menu object representing the feature module not included in the set of feature modules represented by the set of menu objects in the main menu bar.

4. The method of claim 3, wherein the customization menu object, upon selection by the end user, facilitates at least one of:
accessing information about the feature module represented by the customization menu object; and
adding the feature module represented by the customization menu object to the main menu bar.

5. The method of claim 4, further comprising:
detecting, by the computer-implemented media service user interface system, a user selection of the customization menu object; and adding, by the computer-implemented media service user interface system, an additional menu object representative of the feature module represented by the customization menu object to the main menu bar.

6. The method of claim 4, further comprising:
detecting, by the computer-implemented media service user interface system, a user selection of the customization menu object; and
presenting, by the computer-implemented media service user interface system in the media service graphical user interface, information about the feature module represented by the customization menu object and a user-selectable option to add the feature module represented by the customization menu object to the main menu bar.

7. The method of claim 2, further comprising:
detecting, by the computer-implemented media service user interface system during operation in the menu bar customization mode, an additional user input dragging and dropping an additional menu object included in the set of menu objects included in the main menu bar from a first position to a second position within the main menu bar; and
rearranging, by the computer-implemented media service user interface system in response to the additional user input, the set of menu objects within the main menu bar.

8. The method of claim 2, further comprising:
detecting, by the computer-implemented media service user interface system during operation in the menu bar customization mode, either the first user input or the second user input; and
removing, by the computer-implemented media service user interface system in response to either the first user input or the second user input, the menu object from the main menu bar.

9. The method of claim 2, further comprising:
receiving, by the computer-implemented media service user interface system during operation in the menu bar customization mode, an additional user input defining a customization to the main menu bar;
implementing, by the computer-implemented media service user interface system, the customization of the main menu bar; and
exiting, by the computer-implemented media service user interface system, the menu bar customization mode.

10. The method of claim 9, further comprising presenting, by the computer-implemented media service user interface system after the exiting of the main menu customization mode, the main menu bar in the media service graphical user interface in accordance with the customization of the main menu bar.

11. The method of claim 9, further comprising automatically propagating, by the computer-implemented media service user interface system, the customization of the main menu bar from the media service graphical user interface provided for display on the display screen of the user device to a second media service graphical user interface displayed on a display screen of a second user device associated with the end user of the media service.

12. The method of claim 1, wherein the media service graphical user interface further includes a media service dashboard view that comprises a set of feature module sections representing a second set of feature modules of the media service, the feature module sections positioned within the media service dashboard view in accordance with a customization of the media service dashboard view defined by the end user of the media service, each feature module section included in the set of feature module sections comprising dynamic feature content obtained from a different feature module of the media service.

13. The method of claim 12, wherein the second set of feature modules represented by the set of feature module sections is different from the set of feature modules represented by the set of menu objects included in the main menu bar.

14. The method of claim 1, embodied as computer-executable instructions on at least one non-transitory computer-readable medium.

15. The method of claim 1, wherein the main menu tab is positioned at a horizontally central portion of the main menu bar within the media service graphical user interface.

16. The method of claim 1, wherein the main menu tab extends downwardly from and is in contact with the horizontal header bar when the main menu bar is in the closed position.

17. A method comprising:
providing, by a computer-implemented media service user interface system, a view of a media service graphical user interface for display on a display screen of a user device associated with an end user of a media service, the view of the media service graphical user interface comprising:
a horizontal header bar;
a main menu bar that extends parallel to the horizontal header bar and that includes a set of menu objects representing a first set of feature modules of the media service and a menu bar management object arranged at a rightmost position with respect to each other menu object included in the set of menu objects and selectable by the end user to launch a menu bar customization mode that facilitates a customization of the main menu bar by the end user of the media service without navigating away from the main menu bar in the media service graphical user interface, a placement of the menu bar management object being static at the rightmost position regardless of an input provided by the end user to horizontally scroll the set of menu objects within the main menu bar, each menu object included in the set of menu objects selectable by the end user to launch a different feature module included in the first set of feature modules, the set of menu objects selected and positioned in the main menu bar in accordance with the customization of the main menu bar defined by the end user of the media service, each menu object included in the set of menu objects arranged linearly with respect to each other along a horizontal line within the main menu bar, the menu bar customization mode facilitating deletion, by the end user, of a menu object included in the set of menu objects either by way of a first user input selecting a delete symbol that is provided for display together with the menu object while in the menu bar customization mode or a second user input that includes the end user dragging the menu object out of the main menu bar; and
a media service dashboard that comprises a set of feature module sections representing a second set of feature modules of the media service, the feature module sections selected and positioned within the media service dashboard in accordance with a customization of the media service dashboard defined by the end user of the media service;

detecting, by the computer-implemented media service user interface system, a user selection of a main menu tab associated with the main menu bar; and transitioning, by the computer-implemented media service user interface system in response to the user selection of the main menu tab, the main menu bar from an open position in which the set of menu objects is displayed within the media service graphical user interface to a closed position in which the set of menu objects is not displayed within the media service graphical user interface;

wherein the main menu tab extends downwardly from the main menu bar when the main menu bar is in the open position and the main menu tab extends downwardly from the horizontal header bar when the main menu bar is in the closed position.

18. The method of claim 17, wherein each feature module section included in the set of feature module sections includes dynamic feature content obtained from a different feature module of the media service.

19. The method of claim 17, wherein the second set of feature modules represented by the set of feature module sections is different from the first set of feature modules represented by the set of menu objects included in the main menu bar.

20. The method of claim 17, embodied as computer-executable instructions on at least one non-transitory computer-readable medium.

21. A method comprising:

receiving, by a media service user interface system, user input provided by an end user of a media service, the user input provided by the end user of the media service by way of a first media service user interface provided by a first user device associated with the end user, the user input defining a customization of a main menu bar of the first media service user interface provided by the first user device, the main menu bar extending parallel to a horizontal header bar of the first media service user interface and including a set of menu objects representing a set of feature modules of the media service and a menu bar management object arranged at a rightmost position with respect to each other menu object included in the set of menu objects and selectable by the end user to launch a menu bar customization mode that facilitates the customization of the main menu bar by the end user of the media service without navigating away from the main menu bar in the first media service user interface, a placement of the menu bar management object being static at the rightmost position regardless of an additional user input provided by the end user to horizontally scroll the set of menu objects within the main menu bar, the menu bar customization mode facilitating deletion, by the end user, of a menu object included in the set of menu objects either by way of a first user input selecting a delete symbol that is provided for display together with the menu object while in the menu bar customization mode or a second user input that includes the end user dragging the menu object out of the main menu bar;

implementing, by the media service user interface system, the customization of the main menu bar in the first media service user interface provided by the first user device;

automatically propagating, by the media service user interface system, the customization of the main menu bar from the first media service user interface to a second media service user interface provided by a second user device associated with the end user, the first user device functioning as a companion to the second user device in relation to the media service;

detecting, by the media service user interface system after the automatically propagating of the customization of the main menu bar to the second media service user interface, a user selection of a main menu tab associated with the main menu bar of the second media service user interface; and transitioning, by the media service user interface system in response to the user selection of the main menu tab, the main menu bar of the second media service user interface from an open position in which the set of menu objects is displayed within the second media service user interface to a closed position in which the set of menu objects is not displayed within the second media service user interface, each menu object included in the set of menu objects arranged linearly with respect to each other along a horizontal line within the main menu bar;

wherein the main menu tab extends downwardly from the main menu bar of the second media service user interface when the main menu bar of the second media service user interface is in the open position and the main menu tab extends downwardly from a horizontal header bar of the second media service user interface when the main menu bar of the second media service user interface is in the closed position.

22. The method of claim 21, embodied as computer-executable instructions on at least one non-transitory computer-readable medium.

23. A system comprising:

a user device associated with an end user of a media service;

a user interface operation facility that directs the user device to display a media service graphical user interface on a display screen associated with the user device, the media service graphical user interface including a horizontal header bar and a main menu bar that extends parallel to the horizontal header bar and that comprises:

a set of menu objects representing a set of feature modules of the media service, each menu object included in the set of menu objects selectable by the end user to launch a different feature module included in the set of feature modules, each menu object included in the set of menu objects arranged linearly with respect to each other along a horizontal line within the main menu bar; and a menu bar management object arranged at a rightmost position with respect to each other menu object included in the set of menu objects that are arranged linearly with respect to each other along the horizontal line within the main menu bar, a placement of the menu bar management object being static at the rightmost position regardless of an input provided by the end user to horizontally scroll the set of menu objects within the main menu bar, the menu bar management object selectable by the end user to launch a menu bar customization mode without navigating away from the main menu bar in the media service graphical user interface, the menu bar customization mode facilitating deletion, by the end user, of a menu object included in the set of menu objects either by way of a first user input selecting a delete symbol that is provided for display together with the menu object while in the menu bar customization mode or a second user input that includes the end user dragging the menu object out of the main menu bar; and a user interface customization facility that directs the user device to:
  detect a user selection of the menu bar management object;
  launch, in response to the detecting of the user selection of the menu bar management object, the menu bar customization mode;
  receive, during operation in the menu bar customization mode, user input defining a customization of the main menu bar;
  implement the customization of the main menu bar;
  exit the menu bar customization mode;

wherein the user interface operation facility further directs the user device to:
  detect a user selection of a main menu tab associated with the main menu bar; and
  transition, in response to the user selection of the main menu tab, the main menu bar from an open position in which the set of menu objects and the menu bar management object are displayed within the media service graphical user interface to a closed position in which the set of menu objects and the menu bar management object are not displayed within the media service graphical user interface;

wherein the main menu tab extends downwardly from the main menu bar when the main menu bar is in the open position and the main menu tab extends downwardly from the horizontal header bar when the main menu bar is in the closed position.

* * * * *